United States Patent

Hattori et al.

[11] Patent Number: 5,958,565
[45] Date of Patent: Sep. 28, 1999

[54] MAGNETIC RECORDING TAPE FAVORABLY EMPLOYABLE FOR COMPUTER DATA STORAGE

[75] Inventors: Yasushi Hattori; Akira Kasuga; Toshio Kawamata; Tatsuo Ishikawa; Satoru Hayakawa, all of Kanagawa, Japan

[73] Assignee: Fuji Photo Film Co., Ltd., Japan

[21] Appl. No.: 08/848,596

[22] Filed: Apr. 28, 1997

[30] Foreign Application Priority Data

| Apr. 26, 1996 | [JP] | Japan | 8-131157 |
| May 13, 1996 | [JP] | Japan | 8-143596 |
| Jun. 26, 1996 | [JP] | Japan | 8-185666 |
| Jul. 9, 1996 | [JP] | Japan | 8-199812 |
| Oct. 29, 1996 | [JP] | Japan | 8-304112 |
| Oct. 29, 1996 | [JP] | Japan | 8-304113 |

[51] Int. Cl.$^6$ ............................................. G11B 5/70
[52] U.S. Cl. ..................... 428/212; 428/216; 428/323; 428/330; 428/336; 428/694 BB; 428/900
[58] Field of Search ................................ 428/212, 216, 428/336, 694 BB, 900, 330, 323

[56] References Cited

U.S. PATENT DOCUMENTS

| 4,367,261 | 1/1983 | Miyoshi et al. | 428/330 |
| 4,544,601 | 10/1985 | Yamaguchi et al. | 428/330 |
| 4,578,311 | 3/1986 | Ishikuno et al. | 428/336 |
| 4,598,014 | 7/1986 | Miyoshi et al. | 428/323 |
| 4,612,235 | 9/1986 | Ushimaru et al. | 428/216 |
| 4,687,706 | 8/1987 | Miyoshi et al. | 428/330 |
| 4,696,858 | 9/1987 | Ryoke et al. | 428/323 |
| 4,871,606 | 10/1989 | Matsuura et al. | 428/147 |
| 5,677,033 | 10/1997 | Hamano et al. | 428/141 |

*Primary Examiner*—Stevan A. Resan
*Attorney, Agent, or Firm*—Brinks Hofer Gilson & Lione

[57] ABSTRACT

A magnetic recording tape favorably employable for computer data storage has a flexible polymer web, a magnetic recording layer arranged on one surface side of the web, and a backing layer arranged on another surface side of the web, characterized in that the recording tape has a thickness of 2 to 8 μm and shows a Young's modulus of not less than 1,200 kg/mm$^2$ in its longitudinal direction; and the backing layer has a thickness of 0.2 to 1 μm and is composed of a binder, a carbon black, a non-magnetic powder I having Mohs' scale of hardness of 3 to 4.5 and another non-magnetic powder II having Mohs' scale of hardness of 5 to 9. Between the magnetic layer and the flexible polymer web, a non-magnetic undercoating layer composed of a binder and a non-magnetic powder can be provided.

32 Claims, 1 Drawing Sheet

FIGURE
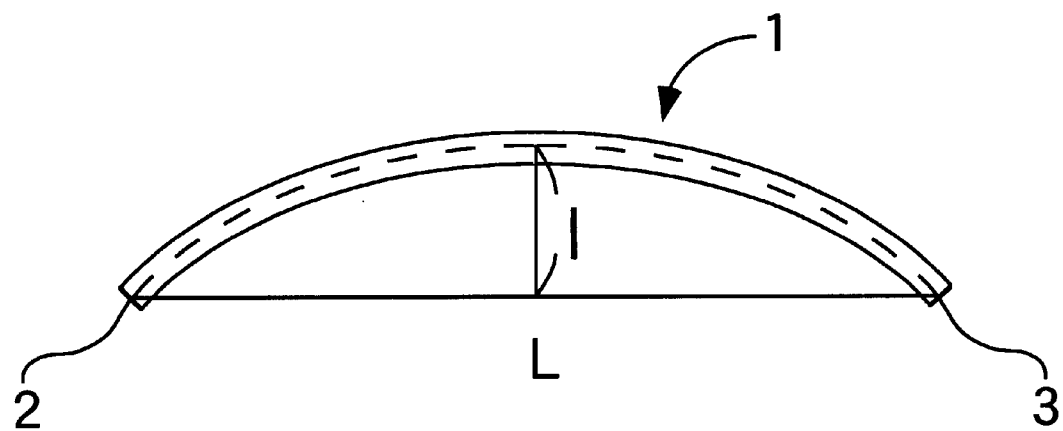

MAGNETIC RECORDING TAPE FAVORABLY EMPLOYABLE FOR COMPUTER DATA STORAGE

FIELD OF THE INVENTION

The present invention relates to a magnetic recording tape favorably employable for computer data storage.

BACKGROUND OF THE INVENTION

Recently, small-sized computers such as mini computers and personal computers have been widely employed in business. For this reason, it has become very important to store computer data with high security, and therefore magnetic recording tapes which are named "back-up tapes" have been employed for that purpose. The magnetic recording tapes for computer storage are further required to have great storage capacity so as to store a great amount of computer data with high security and high reliability.

The back-up tape comprises a flexible plastic web (i.e., support) and a magnetic recording layer provided thereon, in the same manner as in the conventional magnetic recording tapes such as an audio tape and a video tape. The magnetic recording layer comprises a ferromagnetic powder and a binder.

The magnetic recording tape is repeatedly run in contact with a magnetic head. The back-up tape sometimes is more repeatedly run than the conventional audio or video tape. The back-up tape further should show high reliability to keep the stored computer data safely under severe environmental conditions such as at a high temperature and a high relative humidity.

The back-up tape is encased in a cassette, in the same manner as for an audio tape. The most easy way to increase the data storage capacity of a magnetic recording tape is to increase the length of the tape. However, the size of the compact cassette for encasing the back-up tape cannot be freely enlarged. Therefore, if the length of the back-tape is desired to increase, the thickness of the tape should be decreased. For this reason, the most back-up tape has a decreased thickness, as compared with the conventional audio tape.

The increased data storage capacity of a magnetic recording tape also can be attained by decreasing the size of the ferromagnetic powder and decreasing the thickness of the magnetic recording layer. The back-up tape also should have improved electromagnetic characteristics, and the improvement of electromagnetic characteristics can be accomplished by giving to the magnetic recording layer high smoothness.

The decreased tape thickness and increased smoothness of the surface of the magnetic recording layer sometimes cause tape running troubles such as wrong tape winding. For the reason, a back-coating layer is generally provided on the reverse side of the back-up tape, that is, on the surface of the support opposite to the surface on which the magnetic recording layer is provided. The back-coating layer naturally should be thin so as not to apparently increase the tape thickness.

U.S. Pat. No. 5,419,961 discloses a magnetic recording tape having a decreased thickness. For instance, it refers to a magnetic recording tape having a total thickness of 10 μm which has a back-coating layer of 0.5 μm, as well as a magnetic recording tape having a total thickness of 9.5 μm which has a back-coating layer of 0.5 μm. For obtaining a magnetic recording tape having improved anti-static property and running performance, the former magnetic recording tape has a back-coating layer containing a carbon black of a relatively small particle size, and the latter magnetic recording tape has a back-coating layer containing a carbon black of a relatively large particle size as well as a carbon black of a relatively small particle size. It describes further that a preferred support web may comprise a polyester, especially polyethylenenaphthalate (PEN).

From the viewpoint of recent development of the back-up tape, namely, a magnetic recording tape for computer data storage, however, the magnetic recording tape disclosed in the above-mentioned United States Patent is not enough in its performance. Mere decrease of the tape thickness cannot produce a back-up tape having satisfactory electromagnetic and running characteristics.

SUMMARY OF THE INVENTION

The present invention has an object to provide a magnetic recording tape having a decreased thickness but showing satisfactory electromagnetic and running characteristics.

The present invention provides, in one aspect, a magnetic recording tape comprising a flexible polymer web, a magnetic recording layer arranged on one surface side of the web, and a back-coating layer arranged on another surface side of the web, wherein the recording tape has a thickness in the range of 2 to 8 μm and shows a Young's modulus of not less than 1,200 kg/mm$^2$ in its longitudinal direction; and the back-coating layer has a thickness in the range of 0.2 to 1 μm and comprises a binder polymer, a carbon black, a non-magnetic powder I having Mohs' scale of hardness of 3 to 4.5 and a non-magnetic powder II having Mohs' scale of hardness of 5 to 9.

The invention provides, in another aspect, a magnetic recording tape comprising a flexible polymer web, a magnetic recording layer arranged on one surface side of the web via a non-magnetic undercoating layer comprising a binder and a non-magnetic powder, and a back-coating layer arranged on another surface side of the web, wherein the recording tape has a thickness in the range of 2 to 8 μm and shows a Young's modulus of not less than 1,200 kg/mm$^2$ in its longitudinal direction; and the back-coating layer has a thickness in the range of 0.2 to 1 μm and comprises a binder polymer, a carbon black, a non-magnetic powder I having Mohs' scale of hardness of 3 to 4.5 and a non-magnetic powder II having Mohs' scale of hardness of 5 to 9.

Representative preferred magnetic recording tapes are set forth below:

1) The magnetic recording tape wherein the Mohs' scale of hardness of the non-magnetic powder I differs from that of the non-magnetic powder II by at least 2.

2) The magnetic recording tape wherein the non-magnetic powder I comprises calcium carbonate.

3) The magnetic recording tape wherein the non-magnetic powder I has a mean particle size in the range of 30 to 50 nm and the non-magnetic powder II has a mean particle size in the range of 80 to 250 nm.

4) The magnetic recording tape wherein the non-magnetic powder I and the non-magnetic powder II are comprised in the backing layer in a weight ratio of 98:2 to 55:45.

5) The magnetic recording tape wherein the back-coating layer has a surface roughness of 3 to 60 nm.

6) The magnetic recording tape wherein the carbon black comprises a carbon black I having a mean particle size of 10 to 20 nm and a carbon black II having a mean particle size of 230 to 300 nm.

7) The magnetic recording tape of which curl is not more than 2 mm wherein the curl is determined by placing the tape of 1 meter length on a flat plane and measuring a height from the flat plane to the backing layer of the tape.

8) The magnetic recording tape wherein the polymer web comprises an aromatic polyamide.

9) The magnetic recording tape of which heat shrinkage is not more than 0.1% wherein the heat shrinkage is determined after allowing the tape to stand at 70° C., 5% RH for 24 hours.

BRIEF DESCRIPTION OF DRAWING

FIGURE illustrates how the curl of a magnetic recording tape is measured.

DETAILED DESCRIPTION OF THE INVENTION

The magnetic recording tape of the invention is further described below.

The magnetic recording tape of the invention is classified into two types, namely, Type I which comprises a flexible plastic web, a magnetic recording layer provided on one side of the polymer web, and a back-coating layer provided on another side of the polymer web, and Tape II which comprises a flexible polymer web, a combination of a non-magnetic undercoating layer and a magnetic recording layer provided on one side of the polymer web in this order, and a back-coating layer provided on another side of the polymer web.

Magnetic Recording Tape of Type I

First, the magnetic recording tape of Type I is described.

The magnetic recording tape of Type I comprises a flexible polymer web, a magnetic recording layer provided on one side of the polymer web, and a back-coating layer provided on another side of the polymer web.

The magnetic recording tape of the invention should have a thickness of 2 to 8 $\mu$m (preferably 3 to 7 $\mu$m, more preferably 4 to 7 $\mu$m) and shows a large Young's modulus such as 1,200 kg/mm$^2$ or more (preferably 1,300 to 1,700 kg/mm$^2$, more preferably 1,300 to 1,600 kg/mm$^2$). Accordingly, the flexible plastic web (which preferably is non-magnetic and serves as a support) preferably comprises a plastic material of a large Young's modulus such as polyamide (i.e., aromatic polyamide, or aramide) or polyimide (i.e., aromatic polyimide). If the magnetic recording layer, however, comprises a binder polymer having a high glass transition temperature such as polyurethane resin or polyurea resin, the flexible plastic web may comprise a high-molecular weight polymer which is employed for the formation of the conventional magnetic recording tape. Examples of the employable high-molecular weight polymer include polyesters (e.g., polyethylene terephthalate, polyethylene naphthalate, mixture of polyethylene terephthalate and polyethylene naphthalate, a copolymer of ethylene terephthalate and ethylene naphthalate), polyolefins (e.g., polypropylene), cellulose derivatives (e.g., cellulose diacetate, and cellulose triacetate), and polycarbonate.

Most preferred for the flexible plastic web is an aromatic polyamide or an aromatic polyimide.

The aromatic polyamide preferably has a recurring unit having the following formula (I) or (II):

—(NH—Ar$^1$—NHCO—Ar$^2$—CO)—  (I)

—(NH—Ar$^3$—CO)—  (II)

in which each of Ar$^1$, Ar$^2$ and Ar$^3$ represents an aromatic ring (which may be condensed with a another aromatic ring) or a group having at least one aromatic ring.

The aromatic polyamide having the recurring unit of the formula (I) is most preferred.

Examples of the groups represented by Ar$^1$, Ar$^2$ and Ar$^3$ include the following groups:

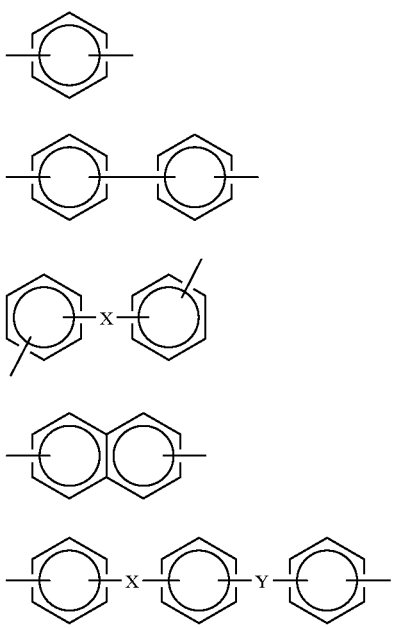

in which each of X and Y represents —O—, —CH$_2$—, —CO—, —SO$_2$—, —S—, or —C(CH$_3$)$_2$—. The aromatic ring may has one or more substituents. Examples of the substituents include halogens (particularly, chlorine), nitro, an alkyl group having 1 to 3 carbon atoms (particularly, methyl), and an alkoxy group having 1 to 3 carbon atoms. The amide bonding may have a substituent.

The aromatic polyamide preferably employable in the invention has 50% or more (more preferably, 70% or more) of aromatic ring units in the molecular structure. Further, the aromatic ring unit preferably comprises an aromatic ring which has a halogen substituent (particularly, chlorine) in an amount of 30% or more. The chlorine substituent is preferably attached to the Ar$^1$ of the above-mentioned formula (I).

The aromatic polyamide may contain a relatively small amount of other recurring units, provided that the incorporation of such other recurring units almost does not disturb the advantageous mechanical characteristics of the aromatic polyamide resin. The aromatic polyamide can be employed in combination with other polymers, provided that the incorporation of such other polymers almost does not disturb the advantageous mechanical characteristics of the aromatic polyamide resin. Commercially available examples of the aromatic polyamide include "Mictron" (trademark of Toray Industries Inc.) and Aramika (trademark of Asahi Chemical Industry Co., Ltd.). More detailed descriptions are given in Japanese Provisional Patent Publications H8-55327 and H8-55328.

The aromatic polyamide more preferably has one of the following recurring units (III), (IV) and (V):

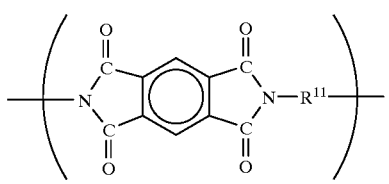
(III)

(IV)

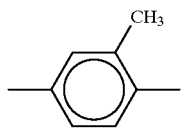
(V)

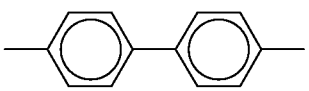

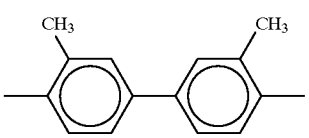

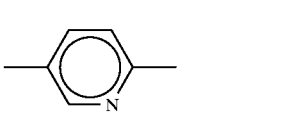

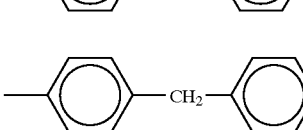

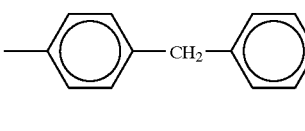

in which each of $R^{11}$, $R^{12}$ and $R^{13}$ represents a aromatic ring, a heterocyclic ring, or a group having at least one aromatic ring. The aromatic ring and heterocyclic ring can have one or more substituents. Examples of the substituents include a halogen atom (particularly, chlorine atom), nitro, an alkyl group having 1 to 3 carbon atoms (particularly, methyl), and an alkoxy group having 1 to 3 carbon atoms.

Preferred examples of $R^{11}$, $R^{12}$ and $R^{13}$ include the groups having the following formula:

The aromatic polyimide employed for the invention comprises preferably not less than 50 molar %, more preferably not less than 70 molar % of the recurring unit represented by one of the above-mentioned formula (III), (IV) and (V). Thus, the aromatic polyimide may contain one or more recurring units other than those of the above-mentioned formulas. The aromatic polyimide may be employed in combination with one or more other polymers.

The aromatic polyamideimide preferably comprises a recurring unit having the following formula (VI), (VII) or (VIII):

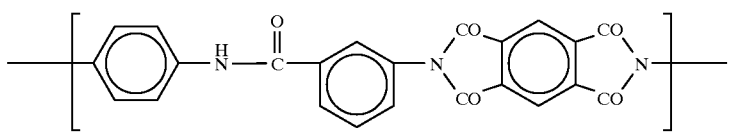
(VI)

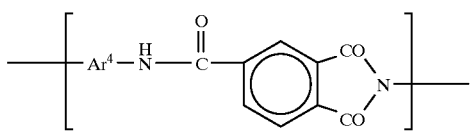
(VII)

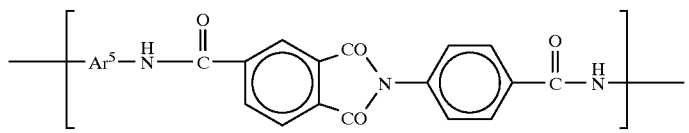

(VIII)

In the above-illustrated formulas, each of $Ar^5$ and $Ar^6$ has the same meaning as that for the aforementioned $Ar^1$.

The non-magnetic flexible polymer web (i.e., support) has generally a thickness of 1.0 to 6.0 µm, preferably 2.0 to 4.7 µm, more preferably 3.0 to 4.5 µm.

In the magnetic recording tape of Type I, a magnetic recording layer is arranged on the support.

The magnetic recording layer comprises a ferromagnetic powder and a binder polymer. The magnetic recording layer may further comprise a lubricant, an electro-conductive carbon black, and an abrasive.

The ferromagnetic powder may comprise $\gamma\text{-}Fe_2O_3$, $Fe_3O_4$, $FeO_x$ (x=1.33–1.5), $CrO_2$, Co-containing $\gamma\text{-}Fe_2O_3$, Co-containing $FeO_x$ (x=1.33–1.5), ferromagnetic metal powders, and/or hexagonal ferrite plate powders. Preferred ferromagnetic powders are ferromagnetic metal powders and hexagonal ferrite plate powders. The ferromagnetic metal powders are most preferred.

The ferromagnetic metal powder preferably has a specific surface area of 30 to 70 $m^2/g$ and a crystallite size of 50 to 300 angstroms (which is determined by X ray diffraction). The ferromagnetic metal powder necessarily contains Fe, and preferably comprises Fe, Fe—Co, Fe—Ni, Fe—Zn—Ni, or Fe—Ni—Co. The ferromagnetic metal powder preferably has a saturation magnetization (σs: saturation magnetic flux density) of not less than 110 emu/g, more preferably of 120 to 170 emu/g. The coercive force (Hc) preferably is in the range of 1,900 to 2,600 Oe, more preferably in the range of 2,000 to 2,400 Oe. The squareness ratio (σr/σs) is preferably not lower than 0.78, preferably in the range of 0.78 to 0.95, more preferably in the range of 0.80 to 0.98. In the squareness ratio, "σs" stands for "saturation magnetic flux density", and "σr" stands for "residual magnetic flux density". The length of longitudinal axis of the metal powder (i.e., mean particle size) preferably is not longer than 0.5 µm, more preferably in the range of 0.01 to 0.3 µm, and the axial ratio (i.e., aspect ratio: length of longitudinal axis/length of width axis) preferably is in the range of 5 to 20, more preferably 5 to 15. The metal powder may further contain one or more non-metallic elements such as B, C, Al, Si and P, or their salts or oxides. The surface of the metal powder may be coated with an oxide film.

The hexagonal ferrite plate powder preferably has a specific surface area of 25 to 65 $m^2/g$, a plate ratio (plate diameter/plate thickness) of 2 to 15, and a plate diameter (i.e., plate size) of 0.02 to 1.0.

The hexagonal ferrite plate powder has an axis of easy magnetization in the direction vertical to the plate surface. The hexagonal ferrite plate preferably comprises barium ferrite, strontium ferrite, lead ferrite, calcium ferrite, or its cobalt-containing ferrite. Most preferred are cobalt-containing barium ferrite and cobalt-containing strontium ferrite. The ferrite plate powder may further contain one or more other elements such as In, Zn, Ge, Nb or V.

The ferromagnetic powder preferably has a water content in the range of 0.01 to 2 wt. % and shows pH in the range of 4 to 12, more preferably 5 to 10. The ferromagnetic powder may be coated on its surface with Al, Si, P or their oxide in an amount of 0.1 to 10 wt. % (based on the amount of the ferromagnetic powder). The ferromagnetic powder also may contain one or more inorganic ions of Na, Ca, Ni and Si in amounts of not more than 5,000 ppm.

The binder polymer may be a thermoplastic, thermosetting or reactive resin, or one of their mixtures.

Examples of the thermoplastic resins include homopolymers and copolymers comprising one or more monomer units derived from vinyl chloride, vinyl acetate, vinyl alcohol, maleic acid, acrylic acid, acrylate, vinylidene chloride, acrylonitrile, methacrylic acid, methacrylate, styrene, butadiene, ethylene, vinyl butyral, vinyl acetal or vinyl ether. Examples of the copolymers include vinyl chloride-vinyl acetate copolymer, vinyl chloride-vinylidene chloride copolymer, vinyl chloride-acrylonitrile copolymer, acrylate-acrylonitrile copolymer, acrylate-vinylidene chloride copolymer, acrylate-styrene copolymer, methacrylate-acrylonitrile copolymer, methacrylate-vinylidene chloride copolymer, methacrylate-styrene copolymer, vinylidene chloride-acrylonitrile copolymer, butadiene-acrylonitrile copolymer, styrene-butadiene copolymer, and chlorovinyl ether-acrylate copolymer.

A polyamide resin, cellulosic resins such as cellulose acetate butylate, cellulose diacetate, cellulose propionate and nitrocellulose, poly(vinyl fluoride), a polyester resin, a polyurethane resin, various rubber resins are also employable.

The thermosetting resin and reactive resin may be a phenol resin, an epoxy resin, a thermosetting polyurethane resin, a urea resin, a melamine resin, an alkyd resin, an acrylic reactive resin, a formaldehyde resin, a silicone resin, an epoxy-polyamide resin, a mixture of a polyester resin and a polyisocyanate prepolymer, a mixture of polyester polyol and polyisocyanate, and a mixture of polyurethane and polyisocyanate. The polyurethane resin may be a known polyester polyurethane, polyether polyurethane, polyether polyester polyurethane, polycarbonate polyurethane, polyester polycarbonate polyurethane, or a polycaprolactone polyurethane. The polyisocyanate may be an isocyanate such as tolylene diisocyanate, 4,4'-diphenylmethane diisocyanate, hexamethylene diisocyanate, xylylene diisocyanate, naphthylene-1,5-diisocyanate, o-toluidine diisocyanate, isophorone diisocyanate or triphenylmethane triisocyanate, a product of the isocyanate and a polyalcohol, or a polyisocyanate produced by condensation of these isocyanates.

Preferred binder polymers are combinations of the polyurethane resin and other resins such as the vinyl chloride resin, vinyl acetate-vinyl chloride copolymer, vinyl chloride-vinyl acetate-vinyl alcohol copolymer, vinyl chloride-vinyl acetate-maleic anhydride copolymer, and nitrocellulose. The polyisocyanate can be incorporated into the polymer mixtures.

The binder polymer preferably has a polar group such as —COOM, —$SO_3M$, —$OSO_3M$, —P=O(OM)$_2$, —O—P=O(OM)$_2$, wherein M is hydrogen or an alkali metal, —OH, —$NR_2$, —$N^+R_3$, wherein R is a hydrocarbon group, epoxy group, —SH, and —CN, if desired, so as to impart to the magnetic recording layer improved magnetic powder dispersion and improved endurance. The polar group can be incorporated to the binder polymer by copolymerization or addition reaction, and is preferably contained in the binder polymer in an amount of $10^{-1}$ to $10^{-8}$ mol/g, more preferably $10^{-2}$ to $10^{-6}$ mol/g.

The binder polymer employed in the magnetic recording layer of the magnetic recording tape of the invention preferably comprises a polyurethane resin having a high glass transition temperature (Tg) so as to increase a Young's modulus in the longitudinal direction of tape and impart to the tape increased rigidity or stiffness. The polyurethane resin preferably is polyurethane produced by reaction of a short-chain diol having a weight average molecular weight of 50 to 500 (preferably 60 to 300) and a diisocyanate, or a polyurethane-polyurea produced by reaction of the short-chain diol, a short-chain diamine having a weight average molecular weight of 50 to 500 (preferably 62 to 300) and a diisocyanate. The polyurethane and polyurethane-polyurea preferably contain a small amount (not more than 5 molar %) of a long-chain diol and a long-chain diamine, both having a weight average molecular weight of 500 to 5,000, respectively.

Each of the preferred polyurethane and polyurethane-polyurea preferably has a weight average molecular weight of 10,000 to 100,000, more preferably 20,000 to 80,000, and further preferably has a high glass transition temperature (Tg) in the range of 40 to 150° C., more preferably 70 to 140° C., especially 100 to 130° C. The polyurethane and polyurethane-polyurea having such high glass transition temperature are described in Japanese Patent Provisional Publications No. H7-50010 and No. H-7-282435.

The binder polymer is generally incorporated in the magnetic recording layer in an amount of 5 to 50 weight parts, preferably 10 to 30 weight parts, based on 100 weight parts of the ferromagnetic powder. The binder polymer preferably is a mixture of 5 to 70 wt. % of a vinyl chloride resin, 2 to 50 wt. % of a polyurethane resin (an ordinary polyurethane resin, or the above-mentioned polyurethane or polyurethane-polyurea resin having a high glass transition temperature), and 2 to 50 wt. % of a polyisocyanate.

The combination of appropriately selected support web material and binder polymer provides the resulting magnetic recording tape with a satisfactory hardness of a Young's modulus of not less than 1,200 kg/mm² in the longitudinal direction of the recording tape. A magnetic recording tape having the high hardness in the longitudinal direction is favorably employable particularly as the magnetic recording tape for computer data storage.

The lubricant can be incorporated into the magnetic recording layer so that it can come out onto the surface of the recording layer. The lubricant can release friction between the surface of the recording layer and a magnetic head and maintain smooth contact between the surface of the recording layer and the magnetic head. Typically, the lubricant is a fatty acid or its ester.

Examples of the fatty acids employable as lubricant include acetic acid, propionic acid, 2-ethylhexanoic acid, lauric acid, myristic acid, palmitic acid, stearic acid, behenic acid, arakinic acid, oleic acid, elaidic acid, linolic acid, linoleic acid, palmitoleic acid, and other aliphatic fatty acid. The fatty acids can be employed singly or in combination.

Examples of the fatty acid esters employable as lubricant include butyl stearate, sec-butyl stearate, isopropyl stearate, butyl oleate, amyl stearate, 3-methylbutyl stearate, 2-ethylhexyl stearate, 2-hexyldecyl stearate, butyl palmitate, 2-ethylhexyl myristate, a mixture of butyl stearate and butyl palmitate, oleyl oleate, butoxyethyl stearate, 2-butoxy-1-propyl stearate, dipropylene glycol monobutyl ether acylated with stearic acid, diethylene glycol dipalmitate, hexamethylene diol acylated with myristic acid, and glycerol oleate. The fatty acid esters can be employed singly or in combination. The fatty acid and fatty acid ester can be employed in combination.

The lubricant can be generally incorporated into the magnetic recording layer in an amount of 0.2 to 20 weight parts, preferably 0.5 to 10 weight parts, based on 100 weight parts of the ferromagnetic powder.

The carbon black can be incorporated into the magnetic recording layer so that the recording layer can have smooth surface. The carbon black preferably has a mean particle size (i.e., diameter) of 5 to 350 m$\mu$ (more preferably 10 to 300 m$\mu$), and a specific surface area of 5 to 500 m²/g (more preferably 50 to 300 m²/g). Further, the carbon black shows a DBP (dibutyl phthalate) oil absorption in the range of 10 to 1,000 mL/100 g (more preferably 50 to 300 mL/100 g), pH of 2 to 10, a water content of 0.1 to 10%, and a tap density of 0.1 to 1 g/cc.

The carbon black can be those produced by various processes. For instance, furnace black, thermal black, acetylene black, channel black, and lamp black can be employed. Examples of commercially available carbon blacks are BLACK PEARLS 2000, 1300, 1000, 900, 800, 700, VOLCAN XC-72 (available from Cabot Corporation), #35, #50, #55, #60 and #80 (available from Asahi Carbon Co., Ltd.), #3950B, #3750B, #3250B, #2400B, #2300B, #1000, #900, #40, #30, and #10B (available from Mitsubishi Chemicals Co., Ltd.), CONDUCTEX SC, RAVEN 150, 50, 40, 15 (available from Columbia Carbon Corp.), Ketchen Black EC, Ketchen Black ECDJ-500, and Ketchen Black ECDJ-600 (available from Lion-Akzo Co., Ltd.).

The carbon black can be generally incorporated into the magnetic recording layer in an amount of 0.1 to 30 weight parts, preferably 0.2 to 15 weight parts, based on 100 weight parts of the ferromagnetic powder.

The abrasive can be fused alumina, silicone carbide, chromium oxide ($Cr_2O_3$), corundum, synthesized corundum, diamond, synthesized diamond, garnet, and emery (main ingredients: corundum and ferrite). The abrasive generally has a Mohs' scale of hardness of not less than 5, preferably not less than 6, and preferably has a mean particle size (i.e., diameter) of 0.05 to 1 $\mu$m, more preferably 0.2 to 0.8 $\mu$m.

The abrasive can be generally incorporated into the magnetic recording layer in an amount of 3 to 25 weight parts, preferably 3 to 20 weight parts, based on 100 weight parts of the ferromagnetic powder.

The magnetic recording tape of the invention comprises a back-coating layer which has a thickness in the range of 0.2 to 1 $\mu$m and comprises a binder polymer, a carbon black, a non-magnetic powder I having Mohs' scale of hardness of 3 to 4.5 and a non-magnetic powder II having Mohs' scale of hardness of 5 to 9.

The back-coating layer preferably has a thickness of 0.2 to 0.8 $\mu$m, more preferably 0.3 to 0.7 $\mu$m.

Examples of the binder polymers employable for the formation of the back-coating layer include those described for the binder polymer for the formation of the magnetic recording layer.

The carbon black employable for preparing the back-coating layer may be one of carbon blacks described for the preparation of the magnetic recording layer.

The carbon black preferably comprises a combination of two or more carbon black having different mean particle size (i.e., diameter). One carbon black preferably has a mean particle size of 10 to 20 mμ (carbon black I) and another carbon black preferably has a mean particle size of 230 to 300 mμ (carbon black II). The carbon black I having such a relatively small particle size imparts to the back-coating layer a low surface electric resistance and a low light transmittance. The low light transmittance may be advantageous for the use in such a magnetic recording device which works upon detection of light transmittance of running magnetic recording tape therein. Moreover, the carbon black I having such a relatively small particle size can reduce a friction coefficient efficiently when it is employed in combination with a liquid lubricant, because the carbon black I having the small particle size can well retain the liquid lubricant on its surface.

The carbon black II having a relatively large particle size can serve as solid lubricant and further form a protrusion of a small size on the surface of the back-coating layer. Such small size protrusion can reduce the total area of contact between the back-coating layer and the support members (for instance, guide poles) of the recording device. The reduced contact area results in reducing the friction coefficient between the back-coating layer and the support members.

Commercially available examples of the carbon black I having a relatively small particle size include RAVEN 2000B (particle size: 18 mμ) and RAVEN 1500B (17 mμ), both of which are available from Columbia Carbon Corp., BP 800 (17 mμ) available from Cabot Corporation, PRINTEX 90 (14 mμ), PRINTEX 95 (15 mμ), PRINTEX 85 (16 mμ) and PRINTEX 75 (17 mμ), all of which are available from Degussa Corporation, and #3950 (16 mμ) available from Mitsubishi Chemicals Co., Ltd.

Commercially available examples of the carbon black II having a relatively large particle size include THERMAL BLACK (270 mμ) available from Karnculb Corporation and RAVEN MTP (275 mμ) available from Columbia Carbon Corporation.

The ratio of carbon black I and carbon black II preferably is 98:2 to 75:25, by weight, more preferably 95:5 to 85:15. The total amount of carbon black(s) generally is in the range of 30 to 80 weight parts, preferably 45 to 65 weight parts, based on 100 weight parts of the binder polymer of the back-coating layer.

The combined use of the carbon black I having a relatively small particle size and the carbon black II having a relatively large particle size particularly in the specific ratio in the back-coating layer gives improved running performance as well as improved running durability.

The back-coating layer of the magnetic recording tape according to the invention contains at least two kinds of non-magnetic powders, that is, a non-magnetic powder I having Mohs' scale of hardness of 3 to 4.5 and a non-magnetic powder II having Mohs' scale of hardness of 5 to 9. The non-magnetic powder I preferably has a mean particle size of 30 to 50 mμ, while the non-magnetic powder II preferably has a mean particle size of 80 to 250 mμ, more preferably 100 to 210 mμ.

Examples of the non-magnetic powder I having a relatively low hardness include calcium sulfate, calcium carbonate, calcium silicate, barium sulfate, magnesium carbonate, zinc carbonate and zinc oxide. They are employed singly or in combination. Calcium carbonate is most preferred.

Examples of the non-magnetic powder II having a relatively high hardness include α-iron oxide ($Fe_2O_3$), α-alumina ($Al_2O_3$), and chromium oxide ($Cr_2O_3$). They are employed singly or in combination. Most preferred are α-iron oxide and α-alumina.

In the back-coating layer, the non-magnetic powder I preferably differs from the non-magnetic powder II in the Mohs' scale of hardness by at least 2.0, more preferably at least 2.5, most preferably 3.0. The non-magnetic powder I and the non-magnetic powder II are preferably incorporated in the back-coating layer in amounts of 10 to 140 weight parts (more preferably 35 to 100 weight parts) and 3 to 30 weight parts (more preferably 3 to 20 weight parts), respectively, based on 100 weight parts of carbon black. The ratio of the non-magnetic powder I and the non-magnetic powder II preferably is 98:2 to 55:45, by weight, more preferably 95:5 to 60:40, most preferably 90:10 to 70:30.

The combined use of the non-magnetic powder I and the non-magnetic powder II in the back-coating layer provides to the magnetic recording tape prominently improved running performance and running durability.

The back-coating layer preferably further contains a lubricant such as a fatty acid or a fatty acid ester. Examples of the lubricants employable in the back-coating layer are those described for the incorporation into the magnetic recording layer. The lubricant is generally incorporated into the back-coating layer in an amount of 1 to 5 weight parts, based on 100 weight parts of the binder polymer.

The back-coating layer comprising a binder polymer, a carbon black and the combination of the non-magnetic powder having a relatively low hardness and the non-magnetic powder having a relatively high hardness preferably has a surface roughness (i.e, Ra value, center-line average roughness, cut-off at 0.08 mm) in the range of 3 to 60 nm, more preferably 3 to 10 nm, most preferably 3 to 8 nm. The adjustment of the surface roughness can be done by appropriately adjusting the calendering conditions adopted in the calendering processing which is applied onto the a laminate web comprising a support web and a back-coating layer. The adjustment of calendering conditions can be done by choosing appropriate material and surface roughness of the calender roller to be utilized and the calendering pressure.

The satisfactorily adjusted surface roughness on the back-coating layer provides improved running performance. Further, the satisfactorily adjusted surface roughness on the back-coating layer can be duplicated on the surface of the magnetic recording layer when the recording tape is wound tightly, and the magnetic recording layer on which the well adjusted surface roughness is duplicated provides an appropriate friction coefficient between the recording layer and a magnetic head during the running of the recording tape so that excellent running performance can be imparted to the magnetic recording tape.

The magnetic recording tape of the invention preferably shows curl as small as possible, for instance, the curl preferably is not more than 2 mm determined under the condition that the magnetic recording tape of 1 meter length on a flat plane and measuring a height from the flat plane to the backing layer of the tape. The reduction of curl of the recording tape can be accomplished by appropriately choosing the material and thickness of the support web, the magnetic recording layer, and the back-coating layer, and further appropriately adjuring the calendering conditions.

The magnetic recording tape of the invention preferably shows a Young's modules of 1,300 to 1,800 kg/mm², more preferably 1,400 to 1,700 kg/mm², in its longitudinal direction, and further shows a heat shrinkage as small as possible, preferably, the heat shrinkage is not more than 0.1 % wherein the heat shrinkage is determined after allowing the tape to stand at 70° C., 5% RH for 24 hours.

Magnetic Recording Tape of Type II

Second, the magnetic recording tape of Type II is described.

The magnetic recording tape of Type II comprises a flexible plastic web, a magnetic recording layer provided on one side of the plastic web, a non-magnetic undercoating layer intervening the plastic web and the magnetic recording layer, and a back-coating layer provided on another side of the plastic web.

The magnetic recording tape of Type II is essentially the same as that of Type I except for having the non-magnetic undercoating layer (or intermediate layer) which is placed between the flexible plastic web (i.e., support) and the magnetic recording layer.

The non-magnetic undercoating layer comprises a non-magnetic powder and a binder polymer and is essentially non-magnetic. The non-magnetic undercoating layer may contain a small amount of a magnetic powder under the condition that the magnetic property of the non-magnetic undercoating layer does not adversely affect the magnetic property of the magnetic recording layer arranged thereon.

Examples of the non-magnetic powder for the incorporation into the non-magnetic undercoating layer include non-magnetic inorganic powders and carbon black.

The non-magnetic inorganic powder preferably has Mohs' scale of hardness of 5 or more, more preferably 6 or more and can be α-alumina, β-alumina, γ-alumina, carbon silicate, chromium oxide, cerium oxide, α-iron oxide, corundum, silicon nitride, titanium carbide, titanium dioxide, silicon dioxide, boron nitride, zinc oxide, calcium carbonate, calcium sulfate, or barium sulfate. The non-magnetic inorganic powder can be used singly or in combination. Preferred are titanium dioxide, α-alumina, α-iron oxide, and chromium oxide, and the most preferred are titanium dioxide and α-iron oxide.

The non-magnetic inorganic powder preferably has a particle size (namely, mean particle size) of 0.01 to 1.0 μm, more preferably 0.01 to 0.5 μm, specifically preferably 0.02 to 0.1 μm.

The non-magnetic undercoating layer preferably contains the non-magnetic inorganic powder and carbon black in combination.

The carbon black imparts to the non-magnetic undercoating layer appropriate electroconductivity so as to keep the undercoating layer from static electricity and further improves smoothness of the surface of the magnetic recording layer arranged thereon. Examples of carbon black for incorporation into the non-magnetic undercoating layer are those described hereinbefore for the preparation of the magnetic recording layer. The particle size of carbon black for the non-magnetic undercoating layer preferably is not larger than 35 mμ, more preferably is in the range of 10 to 35 mμ.

The carbon black can be incorporated into the non-magnetic undercoating layer in an amount of 3 to 20 weight parts, preferably 4 to 18 weight parts, more preferably 5 to 15 weight parts, based on 100 weight parts of the non-magnetic inorganic powder.

The non-magnetic undercoating layer may further contain a lubricant such as a fatty acid or a fatty acid ester. Examples of the lubricant employable for the incorporation into the non-magnetic undercoating layer are those stated hereinbefore for the magnetic recording layer. The lubricant can be employed in an amount of 0.2 to 20 weight parts based on 100 weight parts of the non-magnetic powder in the non-magnetic undercoating layer.

The binder polymer such as that described hereinbefore for the magnetic recording layer can be employed in an amount of 5 to 50 weight parts, preferably 10 to 30 weight parts, based on 100 weight parts of the non-magnetic powder in the undercoating layer. The binder polymer preferably incorporated into the non-magnetic undercoating layer is a mixture of 5 to 70 wt. % of a vinyl chloride resin, 2 to 50 wt. % of a polyurethane resin (an ordinary polyurethane resin, or the above-mentioned polyurethane or polyurethane-polyurea resin having a high glass transition temperature) and 2 to 50 wt. % of a polyisocyanate.

In the magnetic recording tape of Type II, the magnetic recording layer generally has a thickness of about 0.05 to 1.5 μm, preferably 0.05 to 1.0, more preferably 0.1 to 0.5 μm, most preferably 0.1 to 0.4 μm. The non-magnetic undercoating layer generally has a thickness of about 0.5 to 3.0 μm, preferably 1.2 to 2.5 μm, more preferably 1.5 to 2.0 μm, most preferably 1.5 to 1.8 μm. The ratio of thickness between the magnetic recording layer and the non-magnetic undercoating layer preferably is in the range of 1:2 to 1:15, more preferably 1:3 to 1:10. The thickness of the support (i.e., polymer web) and that of the back-coating layer can be determined in the ranges described hereinbefore for the magnetic recording tape of Type I.

For the preparation of the magnetic recording tape of Type II, the magnetic recording layer is preferably placed on the non-inorganic undercoating layer by the known wet-on-wet process. The wet-on-wet process is performed by coating a magnetic recording layer-coating dispersion on the non-magnetic undercoating layer which is beforehand coated on the support web and is still wet, or by simultaneously coating a non-magnetic undercoating layer-coating dispersion and a magnetic recording layer-coating dispersion on the support web.

A variety of procedures for conducting the wet-on-wet process are described in the following U.S. and Japanese patent publications:

1) U.S. Pat. No. 4,681,062, U.S. Pat. No. 4,480,583 and U.S. Pat. No. 5,302,206 for gravure coating, roller coating, blade coating, and extrusion coating;
2) U.S. Pat. No. 4,854,262, U.S. Pat. No. 5,030,484 and U.S. Pat. No. 5,302,206 for simultaneous coating by means of a coating device comprising two slits in a single coating head; and
3) Japanese Patent Provisional Publication H2-174965 for simultaneous coating by means of an extrusion coating device equipped with a back-up roller.

The coating dispersions (i.e., coating mixtures) for preparing the magnetic recording layer, non-magnetic undercoating layer, and back-coating layer can further contain one or more additives such as a dispersant for uniformly dispersing the ferromagnetic powder or the non-magnetic powder in the coating dispersion, a plasticizer, a electroconductive powder other than carbon black, an anti-static agent, or a bactericide.

Examples of the dispersant include fatty acids having 12 to 18 carbon atoms such as caprylic acid, caproic acid, lauric acid, myristic acid, palmitic acid, stearic acid, behenic acid, oleic acid, elaidic acid, linolic acid, linoleic acid, and stearolic acid, their esters, their salt with alkali metals or alkaline earth metals, namely, metal soaps, fluorinated fatty acid esters, fatty acid amide, polyalkyleneoxide alkylphosphates, lecithin, trialkylpolyolefinoxy quaternary ammonium salts (alkyl of 1 to 5 carbon atoms, and olefin such as ethylene or propylene), sulfates, and copper phthalocyanine. These dispersants can be employed singly or in combination.

As the dispersant, an organic phosphorus compound having one of the following formulas (IX), (X) and (XI) can be favorably employed:

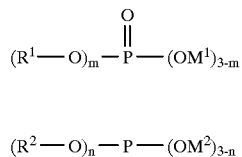

(IX)

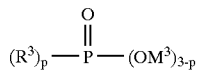

(X)

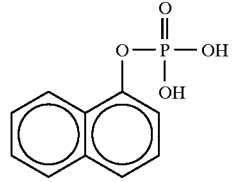

(XI)

In the above-illustrated formulas, each of $R^1$, $R^2$ and $R^3$ is a substituted or unsubstituted, straight chain or branched chain alkyl group having 1 to 22 carbon atoms such as methyl, ethyl, propyl, isopropyl, butyl, isobutyl, pentyl, hexyl, heptyl, octyl, nonyl, decyl, dodecyl, tetradecyl, octadecyl, 2-aminoethyl, or 2-butoxyethyl; a substituted or unsubstituted, straight chain or branched chain alkenyl group having 1 to 22 carbon atoms such as vinyl, propenyl, isopropenyl, butenyl, pentenyl, allyl, or oleyl; or a substituted or unsubstituted aryl group such as phenyl, naphthyl, anthryl, diphenyl, diphenylmethyl, p-ethylphenyl, p-nitrophenyl, tolyl, or xylyl. The aryl group can be indene or tetralin which has a ring other than the benzene ring.

Each of $M^1$, $M^2$ and $M^3$ can be an alkali metal such as sodium or potassium, or a group of $—N^+R_4$ (R is alkyl) such as tetraethylammonium ion.

Each of m, n and p is 1 or 2.

The organic phosphorous compounds having the aforementioned formulas can be mono- or diesters of phosphoric acids, their salts, mono- or diesters of phosphorous acids, their salts, phosphonic acid, its salts, phosphinic acid, and its salts.

Examples of the organic phosphorous compounds employable for the preparation of the magnetic recording tape are illustrated below:

(1)

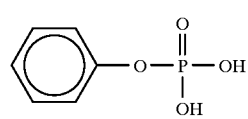

(2)

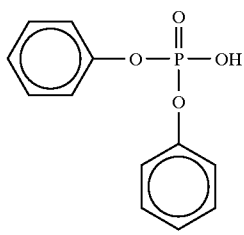

(3)

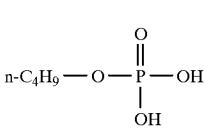

(4)

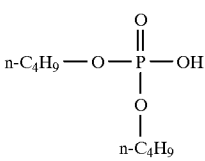

(5)

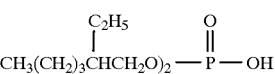

(6)

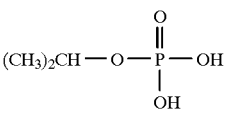

(7)

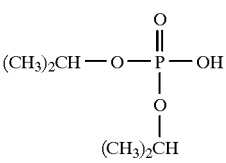

(8)

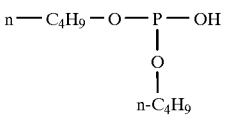

(9)

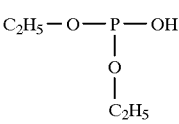

(10)

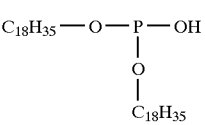

(11)

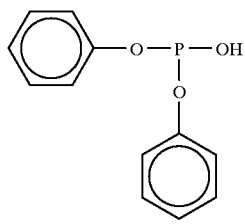
(12)

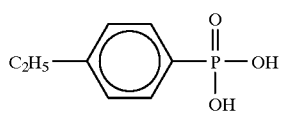
(13)

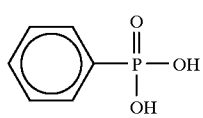
(14)

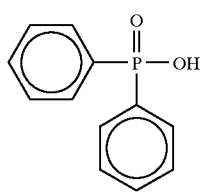
(15)

The preferred organic phosphorous compounds have an aryl group. More preferred are organic phosphorous compounds having a phenyl group. Most preferred is phenylphosphonic acid. Details of the organic phosphorous compounds are described in Japanese Patent Provisional Publication No. H1-189025.

The organic phosphorous compound is preferably incorporated into both of the magnetic recording layer and the non-magnetic undercoating layer when the magnetic recording tape of Type II is prepared. The organic phosphorous compound is preferably incorporated into the layers after it is adsorbed on the surface of the ferromagnetic powder or the non-magnetic powder.

The organic phosphorous compound preferably incorporated into either the magnetic recording layer or the non-magnetic undercoating layer in an amount of 0.1 to 35 weight parts, more preferably 0.5 to 30 weight parts, based on 100 weight parts of the ferromagnetic powder (or non-magnetic powder). If the organic phosphorous compound is incorporated into both the magnetic recording layer and the non-magnetic undercoating layer, the amount of the organic phosphorous compound preferably is in an amount of 0.1 to 20 weight parts, more preferably 0.3 to 15 weight parts, based on 100 weight parts of the ferromagnetic powder (or non-magnetic powder) in each layer.

The magnetic recording tape of the invention preferably comprises a flexible plastic web of aromatic polyamide and has no curl or such a small curl of not more than 2 mm wherein the curl is determined by placing the tape of 1 meter length on a flat plane and measuring a height from the flat plane to the backing layer of the tape. The magnetic recording tape having almost no curl shows reduced output variation. The magnetic recording tape having a support of aromatic polyamide shows enhanced running durability. The magnetic recording tape having almost no curl further shows little damage on the tape edge, when the tape is wound on a tape reel or one of a pair of reels encased n a cartridge such as an 8-mm wide magnetic tape cartridge for information interchange.

Referring to the attached FIGURE, a method for measuring the curl of a magnetic recording tape is described.

The magnetic recording tape stands for a degree of deformation of the tape in the longitudinal direction. The magnetic recording tape is to cut into a sample tape of 1 meter length. The sample tape 1 is placed on a plane surface in such manner that the back-coating layer faces the place surface. The curl corresponds to the maximum height (in terms of "mm") of the sample tape which is determined by measuring the height I at the center positions of the sample tape, namely, the center in the longitudinal direction, the center of the tape width, and the center of the tape thickness, from the line L which is formed by combining the both edges 2, 3 at the center positions, namely, the center of the tape width and the center of the tape thickness.

The curl is expressed in terms of a mean value.

The magnetic recording tape having less curl can be prepared by means of the following method.

1) A magnetic recording tape is prepared by slitting a calendered continuous magnetic recording sheet having a large width, and wound around a hub in such manner that the tape is arranged along the peripheral center of the hub, for instance, the center line of the tape is positioned within ±1.5 mm (preferably ±1.0 mm) of the center line of the peripheral surface of the hub.

2) A calendered continuous magnetic recording sheet having a large width is kept at an elevated temperature (i.e., bulk-thermo treatment) before it is slit to give a magnetic recording tape. The temperature preferably is in the range of 40 to 100° C., more preferably 60 to 80° C. The period of the balk-thermo treatment preferably is in the range of 15 to 50 hours, and its humidity condition preferably is in the range of 5 to 15% RH.

Preferred is a combination of the above procedures 1) and 2). In addition, the curl of the magnetic recording tape can be reduced by relatively loosely winding the tape around the hub.

A preferred magnetic recording tape of the invention has a total thickness of 3.0 to 4.8 μm, and comprises a support of aromatic polyamide or polyimide having a thickness of 2.0 to 3.0 μm, a non-magnetic under coating layer having a thickness of 1.0 to 1.5 μm, a magnetic recording layer having a thickness of 0.1 to 0.5 μm, and a back-coating layer on the reverse side. The preferred magnetic recording tape further shows a heat shrinkage ratio of not more than 0.10 which is determined by keeping the tape at 70° C., 5% RH for 24 hours.

The preferred magnetic recording tape satisfying the above-identified conditions shows reduced output lowering and give a large recording capacity even regardless of the reduced total thickness. Therefore, it is favorably employable as a magnetic recording tape for computer storage which requires high reliability and a large recording capacity.

In more detail, the preferred magnetic recording tape is under the following conditions:

Material of the support: aromatic polyamide or aromatic polyimide

Total thickness of the tape: 3.0 to 4.8 μm, preferably 3.5 to 4.6 μm, more preferably 4.0 to 4.5 μm Thickness of the magnetic recording layer:
0.1 to 0.5 μm, preferably 0.1 to 0.3 μm
Thickness of the non-magnetic undercoating layer:
1.0 to 1.5 μm, preferably 1.0 to 1.4 μm
Thickness of the back-coating thickness: 0.2 to 0.8 μm
Heat shrinkage ratio (70° C., 5% RH, 24 hours): not more than 0.10%, preferably not more than 0.09%, more preferably not more than 0.08%

The low heat shrinkage can be imparted to the magnetic recording tape by heating the magnetic recording web having a large width before calendering, or after calendering, or a combination of heating before calendering and heating after calendering.

A representative process for preparing a magnetic recording tape (Type II) of the invention is described below.

[Step 1]

i) Each of the coating solution (i.e., liquid coating mixture) is prepared.

ii) The prepared coating solutions for the non-magnetic undercoating layer and the magnetic recording layer are coated on one surface of the continuous flexible plastic web to form a non-magnetic undercoating layer and a magnetic recording layer. The coating of the coating solutions for both layers preferably performed by a wet-on-wet process. The wet-on-wet process comprises coating a coating solution for a magnetic recording layer on a coated solution for a non-magnetic undercoating layer while the coated solution is still wet. The wet-on-wet process is described hereinbefore.

iii) The coated solutions are then dried.

[Step 2]

iv) A coating solution for a back-coating layer is coated on the surface of the support (i.e., flexible plastic web) opposite to the surface on which the non-magnetic undercoating solution and the magnetic recording solution are placed.

v) The coated solution is then dried.

[Step 3]

vi) Heat treatment is applied to thus produced continuous magnetic recording sheet to adjust the heat shrinkage ratio. The heat treatment is applied to the continuous magnetic recording sheet at 80 to 150° C., preferably 85 to 130° C. while it runs under a tension of 1 to 5 kg/m. The heat treatment is preferably performed for a short time, though the period of the heat treatment depends on the heating temperature. For instance, the period preferably is in the range of 1 sec. to 1 min. (more preferably 1 to 30 sec.).

vii) The heat-treated continuous magnetic recording sheet (i.e., magnetic recording sheet having a large width) is wound around a core (or bobbin) to form a roll.

viii) Calendering is applied.

[Step 4]

ix) The calendered roll of the magnetic recording sheet is again heated for adjusting the heat shrinkage ratio (this step is hereinafter referred to as "bulk thermo treatment"). The heat treatment is applied to the wound continuous laminate sheet at a relatively low temperature for a long period. For instance, the temperature is in the range of 30 to 80° C., under the condition that the continuous laminate sheet is wound around the roll. The period generally is in the range of 15 to 50 hours, preferably 20 to 30 hours.

A magnetic recording tape having a low heat shrinkage such as 0.10% or less can be produced by applying one of the procedures vi) and ix), but a magnetic recording tape having a lower heat shrinkage such as 0.08% or less can be produced by applying both of the procedures vi) and ix).

x) The heat-treated continuous magnetic recording sheet is slit to give a magnetic recording tape having a predetermined width.

xi) Thus produced magnetic recording tape is encased in a cartridge.

The magnetic recording layer of the invention preferably has a surface roughness in the range of 2.0 to 4.0 nm (more preferably 2.5 to 3.5 nm, most preferably 2.6 to 3.3 nm) which is a value determined by 3D-MIRAU method (which is a three-dimension method). The surface of such surface roughness can be made by adjusting the calendering conditions as mentioned hereinbefore.

The magnetic recording tape of the invention can be favorably employed in a recording system in which signals are recorded at a track pitch of less than 9 μm (preferably 5 to 8 μm, more preferably 5 to 7 μm) which is narrower than that of the conventional system.

The magnetic recording tape of the invention is also preferred when it has a total thickness of not larger than 7.0 μm and comprises a support of aromatic polyamide or aromatic polyimide, a non-magnetic undercoating layer having a thickness of 1.0 to 2.0 μm, a magnetic recording layer having a thickness of 0.05 to 0.5 μm and a surface roughness (measured according to the 3D-MIRAU method) and comprising a ferromagnetic powder (which has a coercive force of 1,900 to 2,600 Oe and a squareness of 0.78 or more), and a back-coating layer. This magnetic recording tape is also favorably employable for storing computer data with high reliability and shows a high running performance.

The present invention is further described by the following examples and comparison examples. In these examples, "part(s)" means "part(s) by weight".

EXAMPLES 1–5 AND COMPARISON EXAMPLES 1–4

Example 1

1) On a continuous web of aromatic polyamide (Mictron, tradename, available from Toray Industries Inc.) having a thickness of 4.4 μm, a coating solution (for magnetic recording layer) having the following composition was coated to give a magnetic recording layer having a thickness of 1.8 μm (after dryness):

[Coating solution for magnetic recording layer]

| | | |
|---|---|---|
| Ferromagnetic metal powder (Fe—Co) (Co content: 10 atom %, coercive force: 1,650 Oe; saturation magnetization (σs): 135 emu /g; specific surface area (BET): 58 m$^2$/g) | 100 | parts |
| Vinyl chloride copolymer (MR110, available from Nippon Zeon Co., Ltd.; polymerization degree: 350; content of —SO$_3$Na group: 5 × 10$^{-6}$ mol/g; content of epoxy group: 3.5 wt. % in terms of monomer unit) | 10 | parts |
| Polyurethane resin (sulfo group-containing polyester-polyurethane, Tg: 38° C., available from Toyobo Co., Ltd.) | 4 | parts |
| Polyisocyanate (Colonate 3041, available from Nippon Polyurethane Industries, Ltd.) | 4 | parts |
| Carbon black (Asahi Carbon Black #50) | 1 | part |
| Abrasive I (α-alumina, HIT55, available from Sumitomo Chemical Company, Ltd.) | 12 | parts |
| Abrasive II (chromium oxide, G5, available from Nippon Chemical Industrial Co., Ltd.) | 1 | part |
| Phenylphosphonic acid | 3 | parts |
| Oleic acid | 0.4 | part |

-continued

[Coating solution for magnetic recording layer]

| | | |
|---|---|---|
| Stearic acid | 0.8 | part |
| Mixture of stearate and palmitate of diethylene glcyol monobutyl ether | 1.2 | parts |
| Isoamyl stearate | 0.2 | part |
| Methyl ethyl ketone | 170 | parts |
| Cyclohexanone | 50 | parts |
| Toluene | 80 | parts |

2) On the reverse surface, the coating solution (for back-coating layer) having the following composition was coated to give a back-coating layer having a thickness of 0.6 μm (after dryness):

[Coating solution for back-coating layer]

| | | |
|---|---|---|
| Carbon black I (BP-800, available from Cabot Corp., mean particle size: 17 mμ) | 100 | parts |
| Carbon black II (Thermal Black, available from Karnculb Corp., mean particle size: 270 mμ) | 10 | parts |
| Non-magnetic powder I (calcium carbonate, available from Shiraishi Industries Co., Ltd., mean particle size 40 mμ, Mohs' scale of hardness: 3.0) | 80 | parts |
| Non-magnetic powder II (α-alumina, HIT 55, available from Sumitomo Chemical Industries Co., Ltd., mean particle size: 200 mμ, Mohs' scale of hardness: 8.5) | 5 | parts |
| Nitrocellulose | 140 | parts |
| Polyurethane resin | 15 | parts |
| Polyisocyanate | 40 | parts |
| Polyester resin | 5 | parts |
| Dispersant: | | |
| copper oleate | 5 | parts |
| copper phthalocyanine | 5 | parts |
| barium sulfate | 5 | parts |
| Methyl ethyl ketone | 2,100 | parts |
| Butyl acetate | 300 | parts |
| Toluene | 600 | parts |

3) The continuous magnetic recording sheet prepared in the above-procedures was subjected to calendering treatment. The calendered continuous magnetic recording sheet was slit to give a magnetic recording tape having 3.8 mm width. The tape was then polished on its surface of the magnetic recording layer. Thus prepared magnetic recording tape was then encased into a cartridge.

The magnetic recording tape had a surface roughness (Ra) of 4 nm on its back-coating layer, and a Young's modulus of 1,500 which was measured in the longitudinal direction.

The Young's modulus was determined in the following manner: A magnetic recording tape of 100 mm long was drawn at a rate of 50 mm/min. in a Young's modulus tensile machine (Tensilon STM-T-50BP, available from Toyo Baldwin Co., Ltd.) under the measuring conditions of 23° C., 50% RH. The Young's modulus was calculated from an S—S curve obtained in the measurement.

Example 2

The procedures of Example 1 were repeated except for replacing the α-alumina (non-magnetic powder II) with 15 parts of α-iron oxide (TF100, available from Toda Industries, Ltd., mean particle size: 110 mμ, Mohs' scale of hardness: 5.5), to give a magnetic recording tape having a surface roughness Ra of 5 nm on its back-coating layer and a Young's modulus of 1,500.

The magnetic recording tape was encased into a cartridge.

Example 3

The procedures of Example 1 were repeated except for replacing the sulfonate group-containing polyesterpolyurethane resin (used for forming the magnetic recording layer) with a polyurethane resin (Tg: 130° C.) produced from a short chain diol having a weight average molecular weight of 240 and a diisocyanate, to give a magnetic recording tape having a Young's modulus of 1,630.

The magnetic recording tape was encased into a cartridge.

Example 4

The procedures of Example 3 were repeated except for replacing the aromatic polyamide support (thickness: 4.4 μm) with a polyethylene terenaphthalate (PEN) having a thickness of 4.5 μm, to give a magnetic recording tape having a surface roughness Ra of 4 nm on its back-coating layer and a Young's modulus of 1,280.

The magnetic recording tape was encased into a cartridge.

Example 5

The procedures of Example 1 were repeated except for replacing the ferromagnetic metal powder with the following ferromagnetic metal powder:

Ferromagnetic metal powder (Fe—Co) (Co content: 5 atom %;

coercive force: 1,750 Oe;

saturation magnetization (σs): 125 emu/g;

specific surface area (BET): 55 $m^2/g$)

to give a magnetic recording tape having a Young's modulus of 1,500.

The magnetic recording tape was encased into a cartridge.

Comparison Example 1

The procedures of Example 1 were repeated except for replacing the aromatic polyamide support (thickness: 4.4 μm) with a polyethylene terephthalate (PET) having a thickness of 4.5 μm, to give a magnetic recording tape having a surface roughness Ra of 4 nm on its back-coating layer and a Young's modulus of 1,030.

The magnetic recording tape was encased into a cartridge.

Comparison Example 2

The procedures of Example 1 were repeated except for replacing the aromatic polyamide support (thickness: 4.4 μm) with a polyethylene naphthalate (PEN) having a thickness of 4.5 μm, to give a magnetic recording tape having a surface roughness Ra of 4 nm on its back-coating layer and a Young's modulus of 1,100.

The magnetic recording tape was encased into a cartridge.

Comparison Example 3

The procedures of Example 1 were repeated except for removing both of Carbon black I and Carbon black II from the coating solution for back-coating layer, to give a magnetic recording tape having a surface roughness Ra of 4 nm on its back-coating layer and a Young's modulus of 1,500.

The magnetic recording tape was encased into a cartridge.

Comparison Example 4

The procedures of Example 1 were repeated except for removing both of Non-magnetic powder I and Non-magnetic powder II from the coating solution for back-coating layer, to give a magnetic recording tape having a surface roughness Ra of 3 nm on its back-coating layer and a Young's modulus of 1,500.

The magnetic recording tape was encased into a cartridge.

Evaluation of Magnetic Recording Tapes (1) Damage of a magnetic recording tape after running The magnetic recording tape was run 100 times on a DAT deck, and thereafter the tape was examined visually and microscopically whether or not damages occurred on the surface of its magnetic recording layer and its edge as well as whether or not a stain was produced on the surface of the magnetic recording layer. The results were expressed in terms of the following criteria:

A: No damage occurs, and no stain is observed.

B: Damage slightly occurs, and some stain is observed.

C: Damage apparently occurs, and stain is marked.

(2) Kinetic friction coefficient on the back-coating layer

The magnetic recording tape having a weight of 10 g (T1) on one end was draped around a guide pole which was employed in a DDS drive for supporting the back surface of a magnetic recording tape, under the condition that the back-coating layer was kept in touch with the guide pole. The tape was drawn from the end opposite to the end attached to the weight at a rate of 8 mm/sec. The force (T2) required to keep the drawing of the tape was measured. The kinetic friction coefficient ($\mu$1) was expressed in terms of T2/T1.

The procedure of drawing the tape under the above-mentioned conditions was repeated 500 times, and thereafter T2/T1 was measured to give a kinetic friction coefficient after the 500 time drawings ($\mu$500).

(3) Stain on the surface of the guide pole

The magnetic recording tape was run 100 times at 8 mm/sec under the condition the back surface of the tape was kept in contact with the guide pole at a weight of 40 g. Thereafter, the guide pole was observed visually and microscopically concerning stain attached to the surface of the surface of the guide pole. The results were expressed in terms of the following criteria:

A: No stain is observed.

B: Stain is slightly observed, but most area has no stain.

C: The area having stain is larger than the area having no stain.

(4) Occurrence of drop-out (DO)

On the magnetic recording tape was recorded signals of a frequency of 2.35 MHz in a DAT deck at an optimum electric current value. The reproduction signals corresponding to the recorded signals were counted by means of a drop-out counter (available from Shibasoku Co., Ltd.). The counting was conducted for 5 minutes, and a mean number of drop-outs at 15$\mu$ sec., −16 dB per one minute was obtained.

(5) Reproduction output

On the magnetic recording tape was recorded signals of a single recording density at 3,000 ftpmm (flux transition per mm: number of frequency where magnetic domain inversion occurs per 1 mm) and 83.3 ftpmm in a DDS-2 drive at an optimum electric current value. The reproduction output was then measured. The reproduction output was converted into a relative value to the reproduction output obtained in the magnetic recording tape of Example (which is expressed in terms of 100).

The results of the evaluations are set forth in Table 1.

TABLE 1

| | Damage after running | Friction coefficient $\mu$ 1 | Friction coefficient $\mu$ 500 | Stain on g. pole | DO (15 $\mu$s) (/min) | Reproduction 3,000 ftppm | Reproduction 83.0 ftppm |
|---|---|---|---|---|---|---|---|
| Example | | | | | | | |
| 1 | A | 0.27 | 0.32 | A | 5 | 100% | 100% |
| 2 | A | 0.27 | 0.33 | A | 5 | 102% | 99% |
| 3 | A | 0.28 | 0.34 | A | 6 | 104% | 101% |
| 4 | A | 0.28 | 0.32 | A | 5 | 98% | 99% |
| 5 | A | 0.27 | 0.32 | A | 5 | 101% | 99% |
| Comparison Example | | | | | | | |
| 1 | B | 0.27 | 0.34 | B | 12 | 88% | 85% |
| 2 | B | 0.28 | 0.33 | A | 9 | 92% | 89% |
| 3 | C | 0.29 | 0.60 | C | 20 | 102% | 101% |
| 4 | C | 0.26 | 0.55 | C | 18 | 103% | 100% |

The results set forth in Table 1 indicate that the magnetic recording tapes of the invention (Examples 1 to 5) do not give so much increase of friction coefficient on the back-coating layer after repeated running, is free from tape damage, gives stain on the guide pole (g. pole in Table 1), shows less drop-outs, and gives little lowering of reproduction output in the wide recording density range.

Each of the magnetic recording tapes of Comparison Examples 1 and 2 having a lower Young's module suffers from tape damage, gives stain on the guide pole, shows increased drop-out, and gives much lowering of reproduction output (which is assumed to be caused non-uniform contact between the tape and the magnetic head. The magnetic recording tape of Comparison Example 3 containing no carbon black in its back-coating layer gives much increase of friction coefficient after repeated running, suffers from apparent tape damage, gives stain on the guide pole, and shows increased drop-outs. The magnetic recording tape of Comparison Example 4 containing no non-magnetic powders in its back-coating layer also gives much increase of friction coefficient after repeated running, suffers from apparent tape damage, gives stain on the guide pole, and shows increased drop-outs.

EXAMPLES 6–13

Example 6

A magnetic recording tape having a tape width of 3.8 mm was prepared in the same manner as in Example 1 and encased in a DDS cartridge for computer data storage in the following manner:

The front end of the tape was placed in the position of +0.5 mm from the axial center of the hub and wound around the hub (made of vinyl chloride resin, diameter: 114 mm, width: 9 mm). The magnetic recording tape wound around the hub was encased in the cartridge. As a friction sheet to be inserted between each side of the hub and each inner wall of the cartridge, an aromatic polyamide sheet having a thickness of 45 $\mu$m was employed.

Example 7

A magnetic recording tape having a tape width of 3.8 mm was prepared in the same manner as in Example 3 and encased in a DDS cartridge for computer data storage in the manner described in Example 6.

Example 8

The procedures of Example 6 were repeated except for placing the front end of the magnetic recording tape in the position of +0.7 mm from the axial center of the hub and winding the tape around the hub, to gives a DDS cartridge in which the magnetic recording tape was encased for computer data storage.

Example 9

The procedures of Example 6 were repeated except for placing the front end of the magnetic recording tape in the position of +1.0 mm from the axial center of the hub and winding the tape around the hub, to gives a DDS cartridge in which the magnetic recording tape was encased for computer data storage.

Example 10

The procedures of Example 6 were repeated except for subjecting the calendered tape to the bulk thermo treatment (70° C., 5% RH, 24 hours) and encasing the tape around the hub, to gives a DDS cartridge having the magnetic recording tape which had a Young's modulus of 1,500 kg/mm$^2$ in the longitudinal direction.

Example 11

The procedures of Example 6 were repeated except for subjecting the calendered tape to the bulk thermo treatment (70° C., 5% RH, 24 hours) and placing the front end of the magnetic recording tape in the position of +2.0 mm from the axial center of the hub and winding the tape around the hub, to gives a DDS cartridge in which the magnetic recording tape was encased for computer data storage.

Example 12

The procedures of Example 6 were repeated except for placing the front end of the slit tape (just after the tape was slit) in the position of +2.0 mm from the axial center of the hub and winding the tape around the hub, to gives a DDS cartridge in which the magnetic recording tape was encased for computer data storage.

Example 13

A magnetic recording tape was prepared in the same manner as in Example 1 except that a coating solution for non-magnetic undercoating layer and having the below mentioned composition was employed for providing a non-magnetic undercoating layer (dry thickness: 1.7 μm) between the support and the magnetic recording layer (dry thickness: 0.2 μm). The coating of the solution for a non-magnetic undercoating layer and the solution for a magnetic recording layer on the support was performed simultaneously by a simultaneous double coating method. The back-coating layer was further provided in the same manner to give a back-coating layer having a dry thickness of 1 μm.

The procedures of Example 6 were repeated except for employing the above-produced magnetic recording tape, to gives a DDS cartridge in which the magnetic recording tape was encased for computer data storage.

The magnetic recording tape had a Young's modulus of 1,400 kg/mm$^2$ in the longitudinal direction and a surface roughness Ra of 4 nm (center line average roughness at cut-off value of 0.08 mm).

[Coating solution for non-magnetic undercoating layer]

| | |
|---|---|
| Non-magnetic powder (titanium dioxide) (rutile type, TiO$_2$ content: higher than 90%, mean primary particle size: 0.035 μm, specific surface area (BET): 40 m$^2$/g, pH: 7.0, DBP (dibutyl phthalate) absorption: 27–38 mL/100 g, Mohs' scale of hardness: 6.0 having a surface treated to form Al$_2$O$_3$) | 90 parts |
| Carbon black (available from Mitsubishi Carbon Co., Ltd., mean primary particle size: 16 mμ, DBP absorption: 80 mL/100 g, pH: 8.0 specific surface are (BET): 250 m$^2$/g, volatile content: 1.5%) | 10 parts |
| Vinyl chloride copolymer (MR110, available from Nippon Zeon Co., Ltd.; polymerization degree: 350; content of —SO$_3$Na group: 5 × 10$^{-6}$ mol/g; content of epoxy group: 3.5 wt. % in terms of monomer unit) | 12 parts |
| Polyurethane resin (sulfonate group-containing polyester-polyurethane, Tg: 38° C., available from Toyobo Co., Ltd.) | 5 parts |
| Polyisocyanate (Colonate L, available from Nippon Polyurethane Industries, Ltd.) | 3 parts |
| Oleic acid | 0.4 part |
| Myristic acid | 0.8 part |
| Methyl ethyl ketone | 150 parts |
| Cyclohexanone | 50 parts |

Evaluation of Magnetic Recording Tape (1) Curl of the tape

The curl of the prepared magnetic recording tape was measured in the aforementioned manner (See FIGURE). The measurement was made on 100 magnetic recording tape samples, and the mean value is given in Table 2.

(2) Reproduction output

The reproduction output of the prepared magnetic recording tape was measured in the same manner described hereinbefore. The reproduction output is set forth in Table 2 in terms of a relative value to the value (as 100) of the magnetic recording tape of Example 6.

(3) Variation of output

In a DAT deck, random signals of 1.2 MB to 4.7 MB Hz were simultaneously recorded and reproduced on the magnetic recording tape. RF waveform of 2.5 msec. at the entrance of the magnetic head was processed by an AD/DC converter to give an average value and the minimum value. The variation of output was calculated by the following equation: Variation of output=average value−minimum value/average value

TABLE 2

| | | | Reproduction output | |
|---|---|---|---|---|
| Example | Curl | Variation of output | 3,000 ftpmm | 83.3 ftpmm |
| 6 | 0.5 mm | 2% | 100% | 100% |
| 7 | 0.5 mm | 3% | 101% | 99% |
| 8 | 1.0 mm | 5% | 101% | 100% |
| 9 | 1.5 mm | 6.5% | 101% | 100% |
| 10 | 0.5 mm | 2% | 102% | 101% |
| 11 | 0.5 mm | 2% | 140% | 90% |

TABLE 2-continued

| Example | Curl | Variation of output | Reproduction output 3,000 ftpmm | 83.3 ftpmm |
|---|---|---|---|---|
| 12 | 3.0 mm | 8% | 100% | 100% |
| 13 | 5.0 mm | 13% | 101% | 100% |

The results set forth in Table 2 indicate that the magnetic recording tape showing less curl gives reduced variation of output.

EXAMPLES 14–16 AND COMPARISON EXAMPLES 5–7

| 1) Coating solution for magnetic recording layer | |
|---|---|
| Ferromagnetic metal powder (Fe—Ni) (Fe:Ni = 96:4; coercive force (Hc): 2,300 Oe; specific surface area (BET): 57 m$^2$/g; crystallite size: 180 angstroms; saturation magnetization ($\sigma$s): 141 emu/g; grain size (mean diameter along the long axis): 0.08 $\mu$m; aspect ratio: 7.5; pH: 9.6; water soluble Na: 5 ppm; water soluble Ca: 10 ppm; water soluble Fe: 10 ppm) | 100 parts |
| Phenylphosphonic acid (for surface treatment) | 3 parts |
| Vinyl chloride copolymer (MR110, available from Nippon Zeon Co., Ltd.; polymerization degree: 350; content of —SO$_3$Na group: 5 × 10$^{-6}$ mol/g; content of epoxy group: 3.5 wt. % in terms of monomer unit) | 10 parts |
| Polyurethane resin (—SO$_3$Na group-containing polyester-polyurethane, content of —SO$_3$Na group: 1 × 10$^{-4}$ mol/g, neopentylglycol/caprolactone polyol/ MDI/0.9/2.6/1, weight ratio) | 2.5 parts |
| Polyisocyanate (Colonate L, available from Nippon Polyurethane Industries, Ltd.) | 2.5 parts |
| $\alpha$-Alumina (particle size: 0.3 $\mu$m) | 10 parts |
| Chromium oxide (Cr$_2$O$_3$) | 1 part |
| Carbon black (particle size: 0.10 $\mu$m) | 3 parts |
| Butyl stearate | 1 part |
| Stearic acid | 2 parts |
| Oleic acid | 1 part |
| Methyl ethyl ketone | 150 parts |
| Cyclohexanone | 50 parts |

All ingredients of the above-identified composition were kneaded in a continuous kneader and dispersed in a sand mill. The resulting dispersion was mixed with 3 parts of polyisocyanate (Colonate L) and 40 parts of butyl acetate. The mixture was passed through a filter having a mean pore size of 1 $\mu$m, to give a coating solution for magnetic recording layer.

| 2) Coating solution for non-magnetic undercoating layer | |
|---|---|
| Non-magnetic powder (titanium dioxide) (rutile type, TiO$_2$ content: higher than 90%, mean primary particle size: 0.035 $\mu$m, specific surface ratio (BET): 40 m$^2$/g, pH: 7.0, DBP (dibutyl phthalate) absorption: 27–38 mL/100 g, Mohs' scale of hardness: 6.0 having a surface treated to form Al$_2$O$_3$) | 90 parts |
| Carbon black (available from Mitsubishi Carbon Co., Ltd., mean primary particle size: 16 m$\mu$, DBP absorption: 80 mL/100 g, pH: 8.0 specific surface ratioi (BET): 250 m$^2$/g, volatile content: 1.5%) | 10 parts |
| Vinyl chloride copolymer (MR110, available from Nippon Zeon Co., Ltd.; polymerization degree: 350; content of —SO$_3$Na group: 5 × 10$^{-6}$ mol/g; content of epoxy group: 3.5 wt. % in terms of monomer unit) | 12 parts |
| Polyurethane resin (—SO$_3$Na group-containing polyester-polyurethane, content of —SO$_3$Na group: 1 × 10$^{-4}$ mol/g, neopentylglycol/caprolactone polyol/ MDI/0.9/2.6/1, weight ratio) | 5 parts |
| Polyisocyanate (Colonate L, available from Nippon Polyurethane Industries, Ltd.) | 3 parts |
| Butyl stearate | 1 part |
| Stearic acid | 2 parts |
| Oleic acid | 1 part |
| Methyl ethyl ketone | 150 parts |
| Cyclohexanone | 50 parts |

All ingredients of the above-identified composition were kneaded in a continuous kneader and dispersed in a sand mill. The resulting dispersion was mixed with 2.5 parts of polyisocyanate (Colonate L) and 40 parts of butyl acetate. The mixture was passed through a filter having a mean pore size of 1 $\mu$m, to give a coating solution for non-magnetic undercoating layer.

| 3) Coating solution a) for back-coating layer | |
|---|---|
| Carbon black I (BP-800, available from Cabot Corp., mean particle size: 17 m$\mu$) | 100 parts |
| Carbon black II (Thermal Black, available from Karnculb Corp., mean particle size: 270 m$\mu$) | 10 parts |
| Non-magnetic powder I (calcium carbonate, available from Shiraishi Industries Co., Ltd., mean particle size: 40 m$\mu$, Mohs' scale of hardness: 3.0) | 80 parts |
| Non-magnetic powder II ($\alpha$-alumina, HIT 55, available from Sumitomo Chemical Industries Co., Ltd., mean particle size: 200 m$\mu$, Mohs' scale of hardness: 8.5) | 5 parts |
| Nitrocellulose | 140 parts |
| Polyurethane resin | 15 parts |
| Polyisocyanate | 40 parts |
| Polyester resin | 5 parts |
| Dispersant: | |
| copper oleate | 5 parts |
| copper phthalocyanine | 5 parts |
| barium sulfate | 5 parts |
| Methyl ethyl ketone | 2,200 parts |
| Butyl acetate | 300 parts |
| Toluene | 600 parts |

All ingredients of the above-identified composition were kneaded in a continuous kneader and dispersed in a sand mill. The resulting dispersion was passed through a filter having a mean pore size of 1 $\mu$m, to give a coating solution for back-coating layer.

4) Coating solutions b) to e) for back-coating layers

Each of the coating solutions b) to e) was prepared in the same manner as above, except for replacing the kind and/or amount of the non-magnetic powders as set forth in Table 3.

TABLE 3

| Coating Solution | Calcium carbonate | | Non-magnetic powder II | | |
|---|---|---|---|---|---|
| | amount (parts) | particle size (mµ) | kind | amount (parts) | particle size (mµ) |
| a | 80 | 40 | α-alumina | 5 | 200 |
| b | 80 | 40 | α-iron oxide | 15 | 110 |
| c | 80 | 40 | Mg carbonate | 5 | 200 |
| d | 0 | — | α-alumina | 5 | 200 |
| e | 80 | 40 | — | — | — |

Remarks: Mohs' scale of hardness
α-alumina: 8.5, α-iron oxide: 5.5, Mg (magnesium) carbonate: 3.0

Example 14

On a continuous aromatic polyamide sheet (support, Mictron, available from Toray Industries, Inc., thickness: 4.4 µm) was simultaneously coated a combination of the above-mentioned coating solution for magnetic recording layer and the above-mentioned coating solution for non-magnetic undercoating layer by a simultaneous double coating method, to give a magnetic recording layer having a thickness of 0.2 µm (after dryness) and a non-magnetic undercoating layer having a thickness of 1.7 µm (after dryness).

The coated layers were treated successively with a cobalt magnet having a magnetic flux density of 3,000 gauss and a solenoid having a magnetic flux density of 1,500 gauss for orientation while the coated layers were still wet. Thus treated coated layers were dried to give a non-magnetic undercoating layer and a magnetic recording layer placed on the undercoating layer.

On the surface of the support opposite to the surface on which the non-magnetic undercoating layer and the magnetic recording layer were provided was coated the coating solution a) for back-coating layer to give a back-coating layer having a thickness of 0.5 µm (after dryness). Thus, a continuous magnetic recording sheet was produced.

The continuous magnetic recording sheet was subjected to calendering (temperature 85° C., linear pressure 300 kg/cm) using a calendering machine comprising seven metal rollers only. The calendered recording sheet was slit to give a magnetic recording tape having a width of 3.8 mm. The magnetic recording tape was then encased in a DDS cartridge to give a data storage means. The magnetic recording tape had surface roughness values Ra (center line average roughness at cut-off 0.08 mm) of 2.5 nm and 5 nm on the magnetic recording layer and the back-coating layer, respectively.

Example 15

The procedures of Example 14 were repeated except for employing the coating solution b) in place of the coating solution a) for forming the back-coating layer, to give a magnetic recording tape. The obtained magnetic recording tape had a surface roughness value Ra of 5 nm on the back-coating layer.

Example 16

The procedures of Example 14 were repeated except for changing the thickness of the magnetic recording layer to have a thickness of 0.1 µm, to give a magnetic recording tape. The obtained magnetic recording tape had a surface roughness value Ra of 5 nm on the back-coating layer.

Comparison Examples 5–7

The procedures of Example 14 were repeated except for employing one of the coating solutions c) to e) in place of the coating solution a) for forming the back-coating layer, to give a magnetic recording tape.

The particulars and Young's modulus values of the magnetic recording tapes prepared in Examples 14 to 16 and Comparison Examples 5 to 7 are set forth in Table 4. The Young's modulus value was determined according to the measuring method defined in ISO/R527. The measurement was performed using a tape sample of 200 mm long and a drawing rate of 100 mm/min.

TABLE 4

| Ex. | Coating solution | Thickness (µm) | | | Young's modulus value (kg/mm²) |
|---|---|---|---|---|---|
| | | total | mag. | non-mag. | |
| Example | | | | | |
| 14 | a | 6.8 | 0.2 | 1.7 | 1,400 |
| 15 | b | 6.8 | 0.2 | 1.7 | 1,350 |
| 16 | a | 6.7 | 0.1 | 1.7 | 1,400 |
| Comparison Example | | | | | |
| 5 | c | 6.8 | 0.2 | 1.7 | 1,400 |
| 6 | d | 6.8 | 0.2 | 1.7 | 1,370 |
| 7 | e | 6.8 | 0.2 | 1.7 | 1,400 |

Evaluation of Magnetic Recording Tapes (1) Friction coefficient ($\mu$ value) on back-coating layer The magnetic recording tape having a weight of 10 g (T1) on one end was draped around a guide pole which was employed in a DDS drive for supporting the back surface of a magnetic recording tape, under the condition that the back-coating layer was kept in touch with the guide pole. The tape was drawn from the end opposite to the end attached to the weight at a rate of 8 mm/sec. The force (T2) required to keep the drawing of the tape was measured. The kinetic friction coefficient ($\mu 1$) was expressed in terms of T2/T1.

The procedure of drawing the tape under the above-mentioned conditions was repeated 500 times, and thereafter T2/T1 was measured to give a kinetic friction coefficient after the 500 time drawings ($\mu 500$).

(2) Stain on the surface of the guide pole

The magnetic recording tape was run 100 times at 8 mm/sec under the condition the back surface of the tape was kept in contact with the guide pole at a weight of 40 g. Thereafter, the guide pole was observed visually and microscopically concerning stain attached to the surface of the surface of the guide pole. The results were expressed in terms of the following criteria:

A: No stain is observed.

B: Stain is slightly observed, but most area has no stain.

C: The area having stain is larger than the area having no stain.

(3) Reproduction output

An output at 13.5 MHz was evaluated using a DDS testing machine ML4500B (available from MediaLogic Corporation). The results are set forth in Table 5 in terms of a relative value to the value obtained on the magnetic recording tape of Example 14 (as 100).

(4) Overwriting characteristics

The overwriting characteristics were evaluated using a DDS testing machine ML4500B. In the evaluation procedure, the signals were recorded on the magnetic recording tape at 4.5 MHz, and again recorded at 13.5 MHz. Thereafter, an output at 4.5 MHz was measured. The results are set forth in Table 5 in terms of a relative value to the value obtained on the magnetic recording tape of Example 14 (as 0 dB).

(5) Running durability

The magnetic recording tape was run 5,000 times (5,000 pass) in TM1 defined in ECMA using a DDS 2 drive. The times of running were measured when the running was stopped due to increase of the error rate.

TABLE 5

| Ex. | μ 500 (back-coating) | Stain on g. pole | Repro. output (dB) | Over-writ. (dB) | Running durability (times) |
|---|---|---|---|---|---|
| Example | | | | | |
| 14 | 0.31 | A | 100 | 0 | 5,000 or more |
| 15 | 0.30 | A | 101 | 0 | 5,000 or more |
| 16 | 0.30 | A | 100 | 0 | 5,000 or more |
| Comparison Example | | | | | |
| 5 | 0.34 | C | 100 | 0 | 1,800 |
| 6 | 0.62 | C | 99 | 0 | 1,600 |
| 7 | 0.35 | C | 99 | 0 | 1,700 |

EXAMPLES 17–23

Example 17

A magnetic recording tape having a tape width of 3.8 mm was prepared in the same manner as in Example 14 and encased in a DDS cartridge for computer data storage.

The squareness ratio and the surface roughness of the magnetic recording layer of the resulting magnetic recording tape were measured in the following manner:

1) Squareness ratio

A saturation magnetic flux density (σs) was measured under an outer magnetic field of 10K Oe by means of a vibrating magnetic power-measuring device. Thereafter, a remaining magnetic flux density (σr) was measured. The squareness ratio (σr/σs) was then calculated.

2) Surface roughness

The magnetic recording layer was measured on its approximately 250 μm×250 μm area for an average surface roughness according to MIRAU method by means of TOPO3D available from WYKO Corporation.

The squareness ratio and the surface roughness of the magnetic recording layer of the resulting magnetic recording tape were 0.82 and 2.5 nm, respectively.

Example 18

A magnetic recording tape was prepared in the same manner as in Example 14 except that the orientation by the solenoid was performed at 2,000 gauss. The resulting magnetic recording tape was then encased in a DDS cartridge for computer data storage.

The squareness ratio and the surface roughness of the magnetic recording layer of the resulting magnetic recording tape were 0.85 and 2.7 nm, respectively.

Example 19

A magnetic recording tape was prepared in the same manner as in Example 14 except that the thickness of the non-magnetic undercoating layer and that of the magnetic recording layer were changed to 1.6 μm and 0.3 μm, respectively. The resulting magnetic recording tape was then encased in a DDS cartridge for computer data storage.

The squareness ratio and the surface roughness of the magnetic recording layer of the resulting magnetic recording tape were 0.81 and 2.6 nm, respectively.

Example 20

A magnetic recording tape was prepared in the same manner as in Example 14 except that the calendering was performed at 80° C. The resulting magnetic recording tape was then encased in a DDS cartridge for computer data storage.

The squareness ratio and the surface roughness of the magnetic recording layer of the resulting magnetic recording tape were 0.82 and 3.5 nm, respectively.

Example 21

A magnetic recording tape was prepared in the same manner as in Example 14 except that the thickness of the magnetic recording layer was changed to 0.1 μm. The resulting magnetic recording tape was then encased in a DDS cartridge for computer data storage.

The squareness ratio and the surface roughness of the magnetic recording layer of the resulting magnetic recording tape were 0.82 and 2.8 nm, respectively.

Example 22

A magnetic recording tape was prepared in the same manner as in Example 14 except that the thickness of the non-magnetic undercoating layer and the total thickness were changed to 2.8 μm and 7.7 μm, respectively. The resulting magnetic recording tape was then encased in a DDS cartridge for computer data storage.

The squareness ratio and the surface roughness of the magnetic recording layer of the resulting magnetic recording tape were 0.82 and 2.5 nm, respectively.

Example 23

A magnetic recording tape was prepared in the same manner as in Example 14 except that the ferromagnetic powder was replaced with the following ferromagnetic powder:

Ferromagnetic metal powder (Fe:Co=70:30)
    coercive force (Hc): 2,700 Oe;
    specific surface area (BET): 57 m$^2$/g;
    crystallite size: 150 angstroms;
    saturation magnetization (σs): 150 emu/g;
    grain size (mean diameter along the long axis): 0.05 μm;
    aspect ratio: 7.5;
    pH: 9.4;
    water soluble Na: 5 ppm;
    water soluble Ca: 10 ppm;
    water soluble Fe: 10 ppm.

The resulting magnetic recording tape was then encased in a DDS cartridge for computer data storage.

The squareness ratio and the surface roughness of the magnetic recording layer of the resulting magnetic recording tape were 0.82 and 2.5 nm, respectively.

Evaluation of Magnetic Recording Tapes (1) Reproduction output

An output at 13.5 MHz was evaluated using a DDS testing machine ML4500B (available from MediaLogic Corporation). The results are set forth in Table 6 in terms of a relative value to the value obtained on the magnetic recording tape of Example 17 (as 100).

(2) Overwriting characteristics

The overwriting characteristics were evaluated using a DDS testing machine ML4500B. In the evaluation procedure, the signals were recorded on the magnetic recording tape at 4.5 MHz, and again recorded at 13.5 MHz. Thereafter, an output at 4.5 MHz was measured. The results are set forth in Table 6 in terms of a relative value to the value obtained on the magnetic recording tape of Example 17 (as 0 dB).

(3) Running durability

The magnetic recording tape was run 5,000 times (5,000 pass) in TM1 defined in ECMA using a DDS 2 drive. The times of running were measured when the runing was stopped due to increase of the error rate.

TABLE 6

| Ex. | Reproduction output (dB) | Overwriting (dB) | Running durability (times) |
| --- | --- | --- | --- |
| 17 | 100 | 0 | 5,000 or more |
| 18 | 114 | 0 | 5,000 or more |
| 19 | 96 | 0 | 5,000 or more |
| 20 | 93 | 0 | 5,000 or more |
| 21 | 99 | 0 | 5,000 or more |
| 22 | 100 | 0 | 5,000 or more |
| 23 | 100 | 1 | 5,000 or more |

EXAMPLES 24–32

| 1) Coating solution for magnetic recording layer | |
| --- | --- |
| Ferromagnetic metal powder (Fe—Co) (Fe:Co = 70:30; coercive force (Hc): 2,350 Oe; specific surface area (BET): 47 m$^2$/g; crystallite size: 175 angstroms; saturation magnetization ($\sigma$s): 147 emu/g; grain size (mean diameter along the long axis): 0.08 $\mu$m; aspect ratio: 7.5; pH: 9.4; water soluble Na: 5 ppm; water soluble Ca: 10 ppm; water soluble Fe: 10 ppm) | 100 parts |
| Phenylphosphonic acid (for surface treatment) | 3 parts |
| Vinyl chloride copolymer (MR110, available from Nippon Zeon Co., Ltd.; polymerization degree: 350; content of —SO$_3$Na group: 5 × 10$^{-6}$ mol/g; content of epoxy group: 3.5 wt. % in terms of monomer unit) | 10 parts |
| Polyurethane resin (—SO$_3$Na group-containing polyester-polyurethane, content of —SO$_3$Na group: 1 × 10$^{-4}$ mol/g, neopentylglycol/caprolactone polyol/ MDI/0.9/2.6/1, weight ratio) | 2.5 parts |
| Polyisocyanate (Colonate L, available from Nippon Polyurethane Industries, Ltd.) | 2.5 parts |
| $\alpha$-Alumina (particle size: 0.3 $\mu$m) | 10 parts |
| Chromium oxide (Cr$_2$O$_3$) | 1 part |
| Carbon black (particle size: 0.10 $\mu$m) | 3 parts |
| Butyl stearate | 1 part |
| Stearic acid | 2 parts |
| Oleic acid | 1 part |
| Methyl ethyl ketone | 150 parts |
| Cyclohexanone | 50 parts |

All ingredients of the above-identified composition were kneaded in a continuous kneader and dispersed in a sand mill. The resulting dispersion was mixed with 3 parts of polyisocyanate (Colonate L) and 40 parts of butyl acetate. The mixture was passed through a filter having a mean pore size of 1 $\mu$m, to give a coating solution for magnetic recording layer.

| 2) Coating solution for non-magnetic undercoating layer | |
| --- | --- |
| Non-magnetic powder (titanium dioxide) (rutile type, TiO$_2$ content: higher than 90%, mean primary particle size: 0.035 $\mu$m, specific surface ratio (BET): 40 m$^2$/g, pH: 7.0, DBP (dibutyl phthalate) absorption: 27–38 mL/100 g, Mohs' scale of hardness: 6.0 having a surface treated to form Al$_2$O$_3$) | 90 parts |
| Carbon black (available from Mitsubishi Carbon Co., Ltd., mean primary particle size: 16 m$\mu$, DBP absorption: 80 mL/100 g, pH: 8.0 specific surface ratio (BET): 250 m$^2$/g, volatile content: 1.5%) | 10 parts |
| Vinyl chloride copolymer (MR110, available from Nippon Zeon Co., Ltd.; polymerization degree: 350; content of —SO$_3$Na group: 5 × 10$^{-6}$ mol/g; content of epoxy group: 3.5 wt. % in terms of monomer unit) | 12 parts |
| Polyurethane resin (—SO$_3$Na group-containing polyester-polyurethane, content of —SO$_3$Na group: 1 × 10$^{-4}$ mol/g, neopentylglycol/caprolactone polyol/ MDI/0.9/2.6/1, weight ratio) | 5 parts |
| Polyisocyanate (Colonate L, available from Nippon Polyurethane Industries, Ltd.) | 3 parts |
| Butyl stearate | 1 part |
| Stearic acid | 2 parts |
| Oleic acid | 1 part |
| Methyl ethyl ketone | 150 parts |
| Cyclohexanone | 50 parts |

All ingredients of the above-identified composition were kneaded in a continuous kneader and dispersed in a sand mill. The resulting dispersion was mixed with 2.5 parts of polyisocyanate (Colonate L) and 40 parts of butyl acetate. The mixture was passed through a filter having a mean pore size of 1 $\mu$m, to give a coating solution for non-magnetic undercoating layer.

| 3) Coating solution a) for back-coating layer | |
| --- | --- |
| Carbon black I (BP-800, available from Cabot Corp., mean particle size: 17 m$\mu$) | 100 parts |
| Carbon black II (Thermal Black, available from Karnculb Corp., mean particle size: 230 m$\mu$) | 10 parts |
| Non-magnetic powder I (calcium carbonate, available from Shiraishi Industries Co., Ltd., mean particle size: 40 m$\mu$, Mohs' scale of hardness: 3.0) | 80 parts |
| Non-magnetic powder II ($\alpha$-alumina, HIT 55, available from Sumitomo Chemical Industries Co., Ltd., mean particle size: 200 m$\mu$, Mohs' scale of hardness: 8.5) | 5 parts |
| Nitrocellulose | 140 parts |
| Polyurethane resin | 15 parts |
| Polyisocyanate | 40 parts |
| Polyester resin | 5 parts |

-continued

3) Coating solution a) for back-coating layer

Dispersant:

| | |
|---|---|
| copper oleate | 5 parts |
| copper phthalocyanine | 5 parts |
| barium sulfate | 5 parts |
| Methyl ethyl ketone | 2,200 parts |
| Butyl acetate | 300 parts |
| Toluene | 600 parts |

All ingredients of the above-identified composition were kneaded in a continuous kneader and dispersed in a sand mill. The resulting dispersion was passed through a filter having a mean pore size of 1 μm, to give a coating solution for back-coating layer.

Example 24

On a continuous aromatic polyamide web (support, Mictron, available from Toray Industries Inc., thickness: 2.5 μm) was simultaneously coated a combination of the above-mentioned coating solution for magnetic recording layer and the above-mentioned coating solution for non-magnetic undercoating layer by a simultaneous double coating method, to give a magnetic recording layer having a thickness of 0.1 μm (after dryness) and a non-magnetic undercoating layer having a thickness of 1.4 μm (after dryness).

The coated layers were treated successively with a cobalt magnet having a magnetic flux density of 3,000 gauss and a solenoid having a magnetic flux density of 1,500 gauss for orientation while the coated layers were still wet. Thus treated coated layers were dried to give a non-magnetic undercoating layer and a magnetic recording layer placed on the undercoating layer.

On the surface of the support opposite to the surface on which the non-magnetic undercoating layer and the magnetic recording layer were provided was coated the coating solution for back-coating layer to give a back-coating layer having a thickness of 0.4 μm (after dryness). Thus, a continuous magnetic recording sheet was produced.

The continuous magnetic recording sheet was run in a heat treatment zone (heated to 120° C.) for 5 seconds at a tension of 3.0 kg/m. The heat treated sheet was then subjected to calendering (temperature 90° C., linear pressure 300 kg/cm) using a calendering machine comprising seven metal rollers only. The calendered recording sheet collected by a roll at a tension of 5 kg, and the rolled recording sheet was kept in a heat treatment zone (heated to 70° C.) for 24 hours.

The heat treated recording sheet was slit to give a magnetic recording tape having a width of 3.8 mm. The magnetic recording tape was then encased in a DDS cartridge to give a data storage means. The magnetic recording tape had surface roughness values Ra (center line average roughness at cut-off 0.08 mm) of 3.1 nm and 5 nm on the magnetic recording layer and the back-coating layer, respectively.

Example 25

The procedures of Example 24 were repeated except for changing the coating amounts of the coating solutions for magnetic recording layer and non-magnetic undercoating layer to give a magnetic recording layer having a thickness of 0.2 μm and a non-magnetic undercoating layer having a thickness of 1.3 μm. The obtained magnetic recording tape had surface roughness values Ra of 2.9 nm and 5 nm on the magnetic recording layer and the back-coating layer, respectively.

Example 26

The procedures of Example 24 were repeated except for changing the coating amounts of the coating solutions for magnetic recording layer and non-magnetic undercoating layer to give a magnetic recording layer having a thickness of 0.3 μm and a non-magnetic undercoating layer having a thickness of 1.2 μm. The obtained magnetic recording tape had surface roughness values Ra of 2.8 nm and 5 nm on the magnetic recording layer and the back-coating layer, respectively.

Example 27

The procedures of Example 24 were repeated except for employing an aromatic polyamide support of 2.9 μm thick and changing the coating amounts of the coating solutions for magnetic recording layer and non-magnetic undercoating layer to give a magnetic recording layer having a thickness of 0.1 μm and a non-magnetic undercoating layer having a thickness of 1.0 μm. The obtained magnetic recording tape had surface roughness values Ra of 3.2 nm and 5 nm on the magnetic recording layer and the back-coating layer, respectively.

Example 28

The procedures of Example 24 were repeated except for employing an aromatic polyamide support of 2.9 μm thick and changing the coating amounts of the coating solutions for magnetic recording layer and non-magnetic undercoating layer to give a magnetic recording layer having a thickness of 0.2 μm and a non-magnetic undercoating layer having a thickness of 1.0 μm. The obtained magnetic recording tape had surface roughness values Ra of 2.9 nm and 5 nm on the magnetic recording layer and the back-coating layer, respectively.

Example 29

The procedures of Example 27 were repeated except for omitting the heat treatment before the calendering to give a magnetic recording tape having a magnetic recording layer of 0.1 μm thick and a non-magnetic undercoating layer of 1.0 μm thick. The obtained magnetic recording tape had surface roughness values Ra of 2.8 nm and 5 nm on the magnetic recording layer and the back-coating layer, respectively.

Example 30

The procedures of Example 27 were repeated except for omitting the heat treatment before the slitting to give a magnetic recording tape having a magnetic recording layer of 0.1 μm thick and a non-magnetic undercoating layer of 1.0 μm thick. The obtained magnetic recording tape had surface roughness values Ra of 2.6 nm and 5 nm on the magnetic recording layer and the back-coating layer, respectively.

Evaluation of Magnetic Recording Tapes (1) Heat shrinkage of tape

The magnetic recording tape was cut to give a tape sample having a length of 100 nm. The tape sample was hung using a weight of 70 mg at 70° C., 50% RH for 24 hours. The length before the hanging and the length after the hanging were both measured. The heat shrinkage ratio was calculated by the following equation:

Heat shrinkage ratio (%)=[(length of sample before hanging-length of sample after hanging)/length of sample before hanging]×100

(2) Reproduction output

An output at 13.5 MHz was evaluated using a DDS testing machine (track pitch: 6.8 μm). The results are set forth in Table 7 in terms of a plus mark (+: relatively good) and a minus mark (−: relatively poor) in comparison with the results observed on the magnetic recording tape of Example 24.

(4) Decrease of output after heating

An output of the magnetic recording tape was measured in the manner of (2) above to give an initial output, and the tape was kept at 60° C., 90% RH for one week. Thereafter, an output of the recording tape was measured, to give an output after heating. The decrease of output was calculated by the following equation:

Output decrease (%)=[(initial output−output after heating)/initial output]×100

The results of the evaluations are set forth in Table 7.

TABLE 7

| Example | Heat shrinkage (%) | Output (dB) | Decrease of output (%) |
|---|---|---|---|
| 24 | 0.09 | 0 | 15 |
| 25 | 0.09 | 0.0 | 16 |
| 26 | 0.09 | −0.5 | 15 |
| 27 | 0.08 | 0.0 | 11 |
| 28 | 0.08 | 0.0 | 12 |
| 29 | 0.09 | 0.2 | 15 |
| 30 | 0.09 | 0.5 | 15 |

What is claimed is:

1. A magnetic recording tape comprising a flexible polymer web that comprises an aromatic polyamide, a magnetic recording layer arranged on one surface side of the web, and a back-coating layer arranged on another surface side of the web, wherein the recording tape has a thickness in the range of 2 to 8 μm and shows a Young's modulus of not less than 1,200 kg/mm² in its longitudinal direction; and the back-coating layer has a thickness in the range of 0.2 to 1 μm and comprises a binder polymer, a carbon black, a non-magnetic powder I having a Mohs' scale of hardness of 3 to 4.5 and another non-magnetic powder II having a Mohs' scale of hardness of 5 to 9.

2. The magnetic recording tape of claim 1, wherein the Mohs' scale of hardness of the non-magnetic powder I differs from that of the non-magnetic powder II by at least 2.

3. The magnetic recording tape of claim 1, wherein the non-magnetic powder I comprises calcium carbonate.

4. The magnetic recording tape of claim 1, wherein the non-magnetic powder I has a mean particle size in the range of 30 to 50 nm and the non-magnetic powder II has a mean particle size in the range of 80 to 250 nm.

5. The magnetic recording tape of claim 1, wherein the non-magnetic powder I and the non-magnetic powder II are comprised in the backing layer in a weight ratio of 98:2 to 55:45.

6. The magnetic recording tape of claim 1, wherein the back-coating layer has a surface roughness of 3 to 60 nm.

7. The magnetic recording tape of claim 1, wherein the carbon black comprises a carbon black I having a mean particle size of 10 to 20 nm and a carbon black II having a mean particle size of 230 to 300 nm.

8. The magnetic recording tape of claim 1, of which curl is not more than 2 mm wherein the curl is determined by placing the tape of 1 meter length on a flat plane and measuring a height from the flat plane to the backing layer of the tape.

9. A magnetic recording tape comprising a flexible polymer web that comprises an aromatic polyamide, a magnetic recording layer arranged on one surface side of the web via a non-magnetic undercoating layer comprising a binder and a non-magnetic powder, and a back-coating layer arranged on another surface side of the web, wherein the recording tape has a thickness in the range of 2 to 8 μm and shows a Young's modulus of not less than 1,200 kg/mm² in its longitudinal direction; and the back-coating layer has a thickness in the range of 0.2 to 1 μm and comprises a binder polymer, a carbon black, a non-magnetic powder I having Mohs' scale of hardness of 3 to 4.5 and another non-magnetic powder II having Mohs' scale of hardness of 5 to 9.

10. The magnetic recording tape of claim 9, wherein the Mohs' scale of hardness of the non-magnetic powder I differs from that of the non-magnetic powder II by at least 2.

11. The magnetic recording tape of claim 9, wherein the non-magnetic powder I comprises calcium carbonate.

12. The magnetic recording tape of claim 9, wherein the non-magnetic powder I has a mean particle size in the range of 30 to 50 nm and the non-magnetic powder II has a mean particle size in the range of 80 to 250 nm.

13. The magnetic recording tape of claim 9, wherein the non-magnetic powder I and the non-magnetic powder II are comprised in the backing layer in a weight ratio of 98:2 to 55:45.

14. The magnetic recording tape of claim 9, wherein the back-coating layer has a surface roughness of 3 to 60 nm.

15. The magnetic recording tape of claim 9, wherein the carbon black comprises a carbon black I having a mean particle size of 10 to 20 nm and a carbon black II having a mean particle size of 230 to 300 nm.

16. The magnetic recording tape of claim 9, wherein the non-magnetic undercoating layer further comprises a carbon black.

17. The magnetic recording tape of claim 9, of which curl is not more than 2 mm wherein the curl is determined by placing the tape of 1 meter length on a flat plane and measuring a height from the flat plane to the backing layer of the tape.

18. The magnetic recording tape of claim 9, of which heat shrinkage is not more than 0.1% wherein the heat shrinkage is determined after allowing the tape to stand at 70° C., 5% RH for 24 hours.

19. The magnetic recording tape of claim 9, wherein the recording tape has a thickness in the range of 4 to 7 μm.

20. The magnetic recording tape of claim 9, wherein the recording tape shows a Young's modulus in the range from 1,300 to 1,600 kg/mm² in its longitudinal direction.

21. The magnetic recording tape of claim 9, wherein the aromatic polyamide comprises a recurring unit having the general formula (I) or (II):

—(NH—Ar¹—NCHO—Ar²—CO)—     (I)

—(NH—Ar³—CO)—     (II)

in which each of $Ar^1$, $Ar^2$ and $Ar^3$ represents an aromatic ring.

22. The magnetic recording tape of claim 9, wherein the polymer web has a thickness in the range from 3.0 to 4.5 μm.

23. The magnetic recording tape of claim 9, wherein said magnetic recording layer comprises a ferromagnetic metal powder and a binder.

24. The magnetic recording tape of claim 23, wherein said ferromagnetic metal powder has a saturation magnetization in the range from 120 to 170 emu/g and a coercive force in the range from 1,900 to 2,600 Oe.

25. The magnetic recording tape of claim 23, wherein said magnetic recording layer further comprises a lubricant.

26. The magnetic recording tape of claim 23, wherein said lubricant comprises a fatty acid and a fatty acid ester.

27. The magnetic recording tape of claim 23, wherein the magnetic recording layer further comprises a carbon black.

28. The magnetic recording tape of claim 23, wherein the magnetic recording layer further comprises an abrasive.

29. The magnetic recording tape of claim 9, wherein the non-magnetic powder in the undercoating layer is selected from the group consisting of titanium dioxide and α-iron oxide.

30. The magnetic recording tape of claim 9, wherein the undercoating layer further comprises a carbon black.

31. The magnetic recording tape of claim 9, wherein the magnetic recording layer has a thickness in the range from 0.05 to 1.0 μm and the undercoating layer has a thickness in the range from 1.2 to 2.5 μm.

32. The magnetic recording tape of claim 9, wherein the non-magnetic powder II comprises α-alumina.

* * * * *